(12) United States Patent
Suzuki et al.

(10) Patent No.: US 11,557,954 B2
(45) Date of Patent: Jan. 17, 2023

(54) TRANSPORT SYSTEM, PROCESSING SYSTEM, AND ARTICLE MANUFACTURING METHOD

(71) Applicant: CANON KABUSHIKI KAISHA, Tokyo (JP)

(72) Inventors: Hitoshi Suzuki, Nagareyama (JP); Takeshi Yamamoto, Fujisawa (JP); Yuuya Toe, Kawasaki (JP); Ryota Okazaki, Yamato (JP); Kichinosuke Hirokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1086 days.

(21) Appl. No.: 16/169,457

(22) Filed: Oct. 24, 2018

(65) Prior Publication Data
US 2019/0131860 A1 May 2, 2019

(30) Foreign Application Priority Data

Oct. 27, 2017 (JP) .............................. JP2017-208421
Oct. 27, 2017 (JP) .............................. JP2017-208422
Nov. 30, 2017 (JP) .............................. JP2017-230989

(51) Int. Cl.
| | |
|---|---|
| *H02K 41/02* | (2006.01) |
| *B23Q 5/22* | (2006.01) |
| *B65G 54/02* | (2006.01) |
| *H02K 41/03* | (2006.01) |
| *B23Q 7/14* | (2006.01) |

(Continued)

(52) U.S. Cl.
CPC ............. *H02K 41/031* (2013.01); *B23Q 7/14* (2013.01); *B65G 37/02* (2013.01); *B65G 47/74* (2013.01); *B65G 54/02* (2013.01); *B65G 2203/042* (2013.01)

(58) Field of Classification Search
CPC ...... H02K 41/00; H02K 41/031; H02K 41/03; H02K 41/02; H02K 11/21; B23Q 7/14; B23Q 5/28; B23Q 5/22; B65G 37/02; B65G 47/74; B65G 54/02; B65G 2203/042; B65G 2203/04; B65G 35/00
See application file for complete search history.

(56) References Cited

U.S. PATENT DOCUMENTS 9,365,354 B2 * 6/2016 Takagi .................. H02P 29/032
10,562,720 B2 * 2/2020 Yamamoto ............. B65G 54/02
(Continued)

FOREIGN PATENT DOCUMENTS

| CN | 103228563 A | 7/2013 |
|---|---|---|
| CN | 103295932 A | 9/2013 |
| DE | 202005006780 U1 | 7/2005 |

(Continued)

*Primary Examiner* — Edgardo San Martin
(74) *Attorney, Agent, or Firm* — Canon U.S.A., Inc. I.P. Division

(57) ABSTRACT

In a transport system that moves a moving portion, which moves in a transport direction along a fixed portion, while detecting a position of the moving portion by a scale and a sensor, a guide block is installed on a second surface of a first part of the moving portion, a guide rail is installed on a first surface of the fixed portion, the scale is installed at an end of the first part of the moving portion on an opposite side across the guide block, and a sensor that has a detecting unit at a position facing the scale is installed in the fixed portion.

19 Claims, 14 Drawing Sheets

(51) Int. Cl.
    *B65G 47/74*     (2006.01)
    *B65G 37/02*     (2006.01)

(56) References Cited

U.S. PATENT DOCUMENTS 10,965,201 B2 * 3/2021 Ota ........................ B65G 43/00
2002/0021050 A1 2/2002 Fujisawa

FOREIGN PATENT DOCUMENTS

| | | | |
|---|---|---|---|
| GB | 404617 A | | 1/1934 |
| JP | 2001-298941 A | | 10/2001 |
| JP | 2002-084733 A | | 3/2002 |
| JP | 2002359961 A | | 12/2002 |
| JP | 2005065430 A | | 3/2005 |
| JP | 2005-253194 A | | 9/2005 |
| JP | 2005-269822 A | | 9/2005 |
| JP | 2005-278280 A | | 10/2005 |
| JP | 2007-074832 A | | 3/2007 |
| JP | 2008-125285 A | | 5/2008 |
| JP | 2013102570 A | | 5/2013 |
| JP | 2016-036227 A | | 3/2016 |
| JP | 2016-036228 A | | 3/2016 |
| JP | 2017022155 A | | 1/2017 |
| JP | 2018193177 A | * 12/2018 | ............ B65G 54/02 |
| JP | 2019059570 A | * 4/2019 | |
| JP | 2019062599 A | * 4/2019 | |
| KR | 10-0642135 B1 | | 11/2006 |

* cited by examiner

TRANSPORT SYSTEM, PROCESSING SYSTEM, AND ARTICLE MANUFACTURING METHOD

BACKGROUND

Field

The present disclosure relates to a transport apparatus that uses a linear motor used for driving or the like of a slider of a transport apparatus for factory automation (FA), a processing system, and an article manufacturing method.

Description of the Related Art

In general, in a factory-automated production line for assembling an industrial product, a transport apparatus that transports a workpiece, a part, or the like is used. Conventionally, there has been a production line in which a large amount of parts each having many complicated shapes and structures, for example, such as a camera or a printer cartridge, are assembled in an assembly line system. Assembling apparatuses that are adjacent are connected to each other by a transport portion, and a workpiece that is a target to be assembled is successively caused to face the respective apparatuses to perform processing continuously. The workpiece transferred from the transport portion is positioned by a positioning apparatus and each of the assembling apparatuses assembles the workpiece that is positioned accurately.

As such an apparatus requiring accuracy of positioning, a linear motor transport apparatus that has high positioning accuracy and does not have a backlash is used. In particular, in a moving magnet linear motor, by arranging parts, such as a driving coil and a sensor head for position detection, which need power in a fixed portion, a wire for power supply does not need to be arranged in a moving portion. A transport carriage of a ball circulation type and a guide rail are used for traveling track and the moving portion is capable of linear movement with high accuracy.

Japanese Patent Laid-Open No. 2005-269822 proposes a control apparatus of a moving magnet linear motor that uses two linear guides. The control apparatus of the moving magnet linear motor is constructed by a linear motor in which a permanent magnet is arranged on a transport carriage (moving portion) and a coil and a linear guide are arranged in a fixed portion, and a detector in which a linear scale is fixed on the transport carriage (moving portion) and a sensor head is fixed on the fixed portion side. A thrust center axis where a thrust of the coil is generated is arranged substantially coincident with a center axis of a space between left and right guide rails when the coil is fixed onto the fixed portion to be held between the left and right guide rails on the fixed portion. Thereby, a magnetic attractive force acting on the magnet is applied to the linear guide as a pressurization.

Japanese Patent Laid-Open No. 2008-125285 proposes a moving coil linear motor that is constructed by using a magnetic attractive force generated in a motor. When a permanent magnet and a coil are arranged in a vertical direction and the magnetic attractive force generated between the permanent magnet and the coil is used, a load in a gravitational direction applied on a transport carriage is able to be reduced.

In Japanese Patent Laid-Open No. 2005-269822, however, the permanent magnet of the transport carriage is arranged between two guide rails that are arranged, and when the center axis of the space between the guide rails is deviated, it is concerned that the transport carriage is deformed due to an attractive force. When the transport carriage is deformed, a position of a workpiece placed on the transport carriage is deviated. Though rigidity of the transport carriage needs to be increased to suppress the deformation, an adverse effect, for example, that the transport carriage becomes heavy due to the increased rigidity and more thrusts are required is caused. There is also a case where a transfer part for the guide rails is difficult to be adjusted. When the permanent magnet of the transport carriage is arranged between the two guide rails that are arranged, a force in a reversed rolling direction is applied to a guide block due to the attractive force. When a force in a rolling direction is applied, the guide rails are distorted and a step is generated at a time of transfer. It is known that durability of the guide block is reduced when the step is large in the guide rails. Though adjustment to reduce the step in the transfer part needs to be performed precisely to increase the durability, in a configuration where two guide rails are used, the adjustment needs to be performed for the two guide rails at the same time and an adjustment work becomes difficult.

In Japanese Patent Laid-Open No. 2008-125285, a guide rail is on a first surface of the fixed portion, the permanent magnet is arranged on a second surface of the fixed portion, which is below the first surface, and further, the permanent magnet faces the coil provided in the transport carriage (moving portion). However, when arrangement of the permanent magnet and the coil is deviated even slightly with respect to the guide rail, a force in a rolling direction is applied to the transport carriage in a transport direction, so that a lifetime of the transport carriage is shortened. Additionally, when an attractive force acts at a deviated position, the transport carriage is deformed. A high-precision sensor requires relative positioning between the sensor and a scale. When any one of the sensor and the scale is installed on a carriage base and the other is installed on the fixed portion, it is possible to know a position of the transport carriage (moving portion) with respect to the fixed portion. When the carriage base is deformed, however, a relative position between the scale and the sensor is deviated, so that it is difficult to perform precise positioning.

SUMMARY

According to an aspect of the present disclosure, a transport system moves a moving portion, which moves in a transport direction along a fixed portion, while detecting a position of the moving portion by a scale and a sensor, the moving portion includes a first part, a second part, and a third part that connects the first part and the second part, the fixed portion is inserted between the first part of the moving portion and the second part of the moving portion, a coil is installed on a second surface of the fixed portion, a magnet is installed on a first surface of the second part of the moving portion, a guide block is installed on a second surface of the first part of the moving portion, a guide rail is installed on a first surface of the fixed portion, the scale is installed at an end of the first part of the moving portion on an opposite side of the third part with the guide block therebetween, and the sensor that has a detecting unit at a position facing the scale is installed in the fixed portion.

An aspect of the present disclosure provides a transport system capable of precise positioning while suppressing deviation of a relative position between a transport carriage (moving portion) and a fixed portion.

Further features will become apparent from the following description of exemplary embodiments with reference to the attached drawings.

DESCRIPTION OF THE EMBODIMENTS

Embodiments of the invention will be described with reference to drawings.

Figure 1:
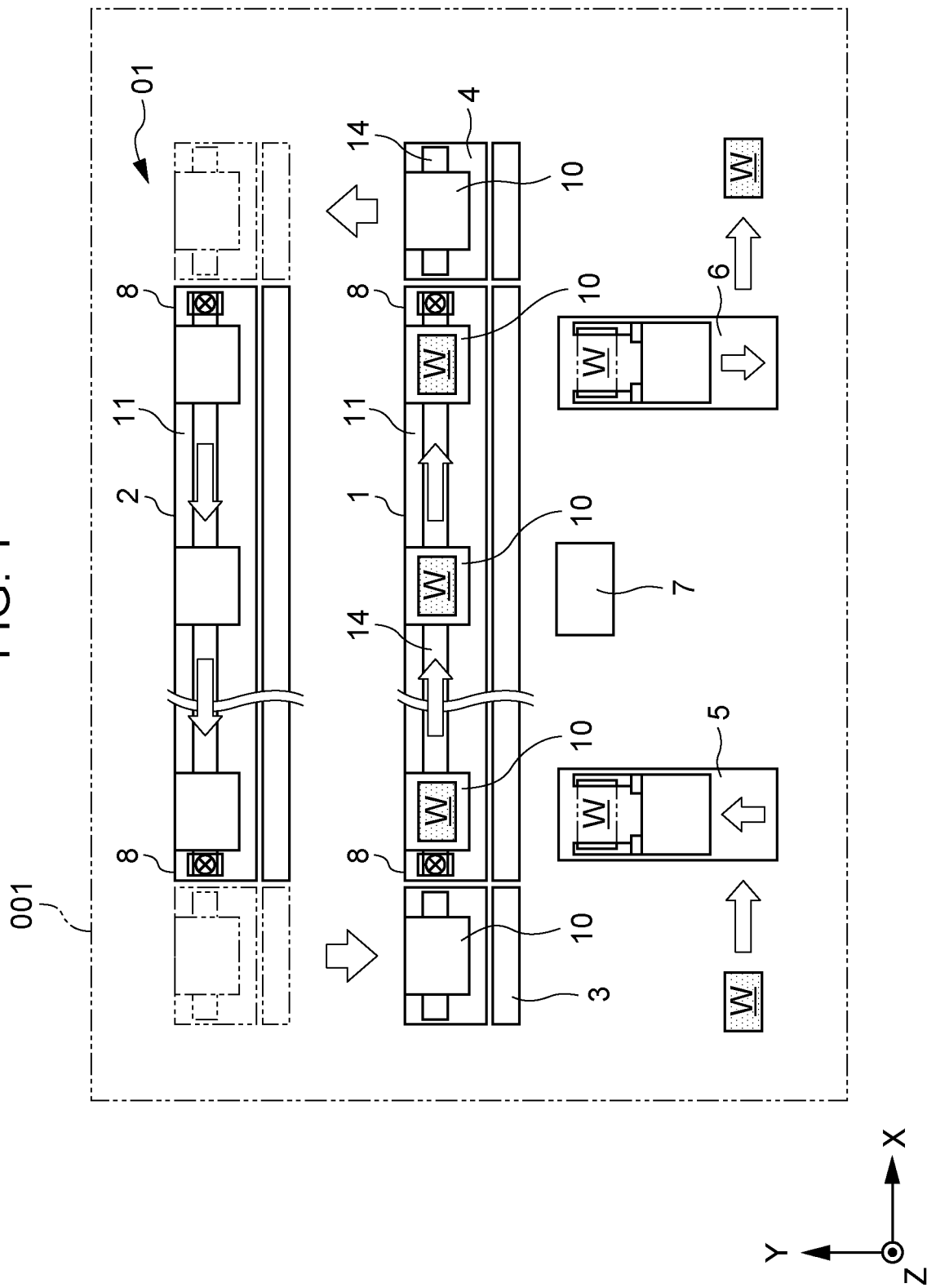
FIG. 1 schematically illustrates an entire configuration of a processing system according to a first embodiment of the invention.

First, an entire configuration of a processing system according to the present embodiment will be described with reference to FIG. 1. FIG. 1 is a schematic view illustrating an entire configuration of a processing system according to the present embodiment and schematically illustrates the entire system as viewed from a first surface.

As illustrated in FIG. 1, a processing system 001 according to the present embodiment has a transport apparatus outward path 1, a transport apparatus homeward path 2, a carriage transfer apparatus 3, a carriage transfer apparatus 4, a workpiece loading apparatus 5, a workpiece unloading apparatus 6, a processing apparatus 7, a blocking apparatus 8, and a transport carriage 10. The processing system 001 according to the present embodiment includes a transport system 01 that transports a workpiece W which is a processing target to be processed and positions the workpiece W on the transport carriage 10. The transport system 01 has the transport apparatus outward path 1, the transport apparatus homeward path 2, the carriage transfer apparatus 3, the carriage transfer apparatus 4, and the blocking apparatus 8 that serve as a fixed portion. The transport apparatus outward path 1, the transport apparatus homeward path 2, the carriage transfer apparatus 3, and the carriage transfer apparatus 4 constitute a transport path of the transport carriage 10 that is a moving portion. In the present embodiment, the transport carriage 10 is referred to as the moving portion and the transport path of the transport carriage 10 is referred to as the fixed portion in some cases. The moving portion is movable in the transport direction with respect to the fixed portion. The transport apparatus outward path 1 and the transport apparatus homeward path 2 are configured to be modularized and have a plurality of transport modules 11.

Here, coordinate axes and directions of an X-axis, a Y-axis, and a Z-axis of an XYZ coordinate system that is an orthogonal coordinate system used in the following description are defined. First, the X-axis is set along the transport direction of the transport carriage 10 that is transported horizontally. An axis vertical to a stand 02 described below that is placed horizontally, that is, an axis along a vertical direction is set as the Z-axis, and an axis orthogonal to the X-axis and the Z-axis is set as the Y-axis. In the XYZ coordinate system whose coordinate axes are defined in this manner, a direction along the X-axis is set as an X direction. In the X direction, a direction that is the same as the transport direction of the transport carriage 10 is set as a +X direction and a direction opposite to the +X direction is set as a −X direction. A direction along the Y-axis is set as a Y direction. In the Y direction, a direction from a right side to a left side with respect to the +X direction is set as a +Y direction and a direction opposite to the +Y direction is set as a −Y direction. A direction along the Z-axis is set as a Z direction. In the Z direction, a direction from the transport path side to the transport carriage 10 side, that is, an upward vertical direction is set as a +Z direction and a direction from the transport carriage 10 side to the transport path side, that is, a downward vertical direction is set as a −Z direction.

In the processing system 001, the transport apparatus outward path 1 and the transport apparatus homeward path 2 each of which constitutes a linear transport path on which the transport carriage 10 is transported are installed in parallel to each other. The transport carriage 10 that is a carriage is transported along the transport apparatus outward path 1 or the transport apparatus homeward path 2. The carriage transfer apparatus 3 is installed most upstream of the transport apparatus outward path 1. Moreover, the carriage transfer apparatus 4 is installed most downstream of the transport apparatus outward path 1. The transport carriage 10 transported along the transport apparatus outward path 1 is transferred to the transport apparatus homeward path 2 by the carriage transfer apparatus 4. Moreover, the transport carriage 10 transported along the transport apparatus homeward path 2 is transferred to the transport apparatus outward path 1 by the carriage transfer apparatus 3. That is, the transport carriage 10 is transported in a circulating manner along the transport apparatus outward path 1 and the transport apparatus homeward path 2. Note that, the number of transport carriages 10 to be installed may be only one or multiple.

In upstream of the transport apparatus outward path 1, the workpiece loading apparatus 5 that is a workpiece supply apparatus for supplying and loading the workpiece W onto the transport carriage 10 is installed. In downstream of the transport apparatus outward path 1, the workpiece unloading apparatus 6 for bringing out and unloading the workpiece W from the transport carriage 10 is installed.

One or a plurality of processing apparatuses 7 are installed between the workpiece loading apparatus 5 and the workpiece unloading apparatus 6. The plurality of processing apparatuses 7 are installed at a predetermined interval. Each of the processing apparatuses 7 applies a predetermined processing work, such as part assembling or coating, to the workpiece W fixed on the transport carriage 10. Note that, the processing apparatus 7 is not particularly limited and a processing apparatus that applies various processing works to the workpiece W is able to be used therefor.

The transport carriage 10 is the carriage that is sequentially transported among the workpiece loading apparatus 5, the processing apparatus 7, and the workpiece unloading apparatus 6 that are installed at a predetermined interval in the transport apparatus outward path 1. To the transport carriage 10, the workpiece W is supplied and loaded by the workpiece loading apparatus 5. Then, after the workpiece W is positioned and fixed on the transport carriage 10, the workpiece W on the transport carriage 10 is subjected to a predetermined processing work by the processing apparatus 7. After all processing works by the processing apparatuses 7 are completed, the workpiece W is brought out from the transport carriage 10 by the workpiece unloading apparatus 6 and an article is manufactured.

Blocking apparatuses 8 are provided at both ends of the transport apparatus outward path 1 and both ends of the transport apparatus homeward path 2 so as to be at parts connected with the carriage transfer apparatus 3 and the carriage transfer apparatus 4. The blocking apparatuses 8 prevent the transport carriage 10 from coming out while the carriage transfer apparatus 3 or the carriage transfer apparatus 4 is not connected.

First Embodiment

Next, with reference to FIGS. 2, 3, and 4A to 4C, a first embodiment will be schematically described with configurations of the transport apparatus outward path 1, the transport apparatus homeward path 2, the carriage transfer apparatuses 3 and 4, and the transport carriage 10 in the transport system 01.

Figure 2:
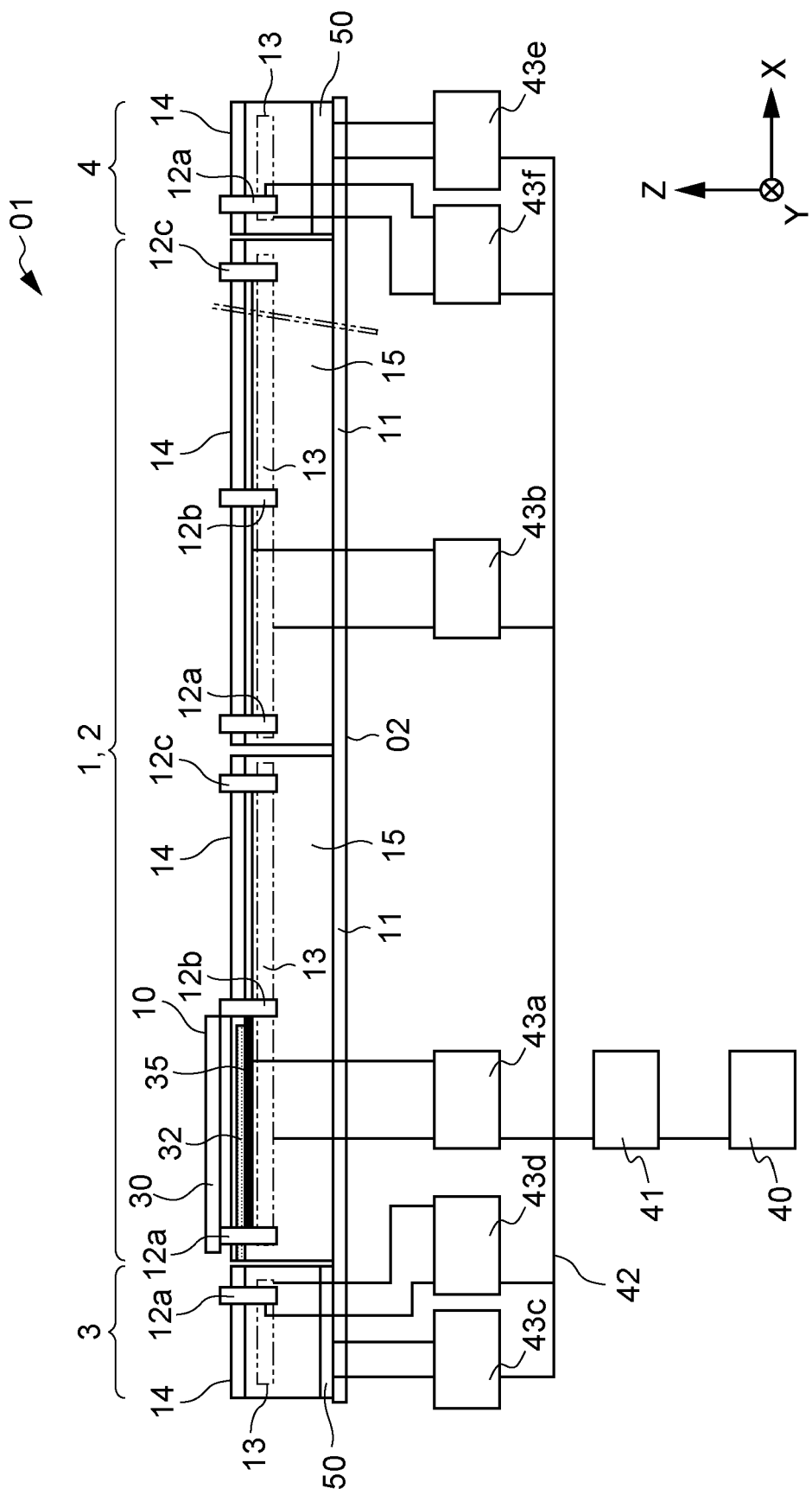
FIG. 2 is a schematic view illustrating a configuration of a transport apparatus according to the first embodiment of the invention.
Figure 3:
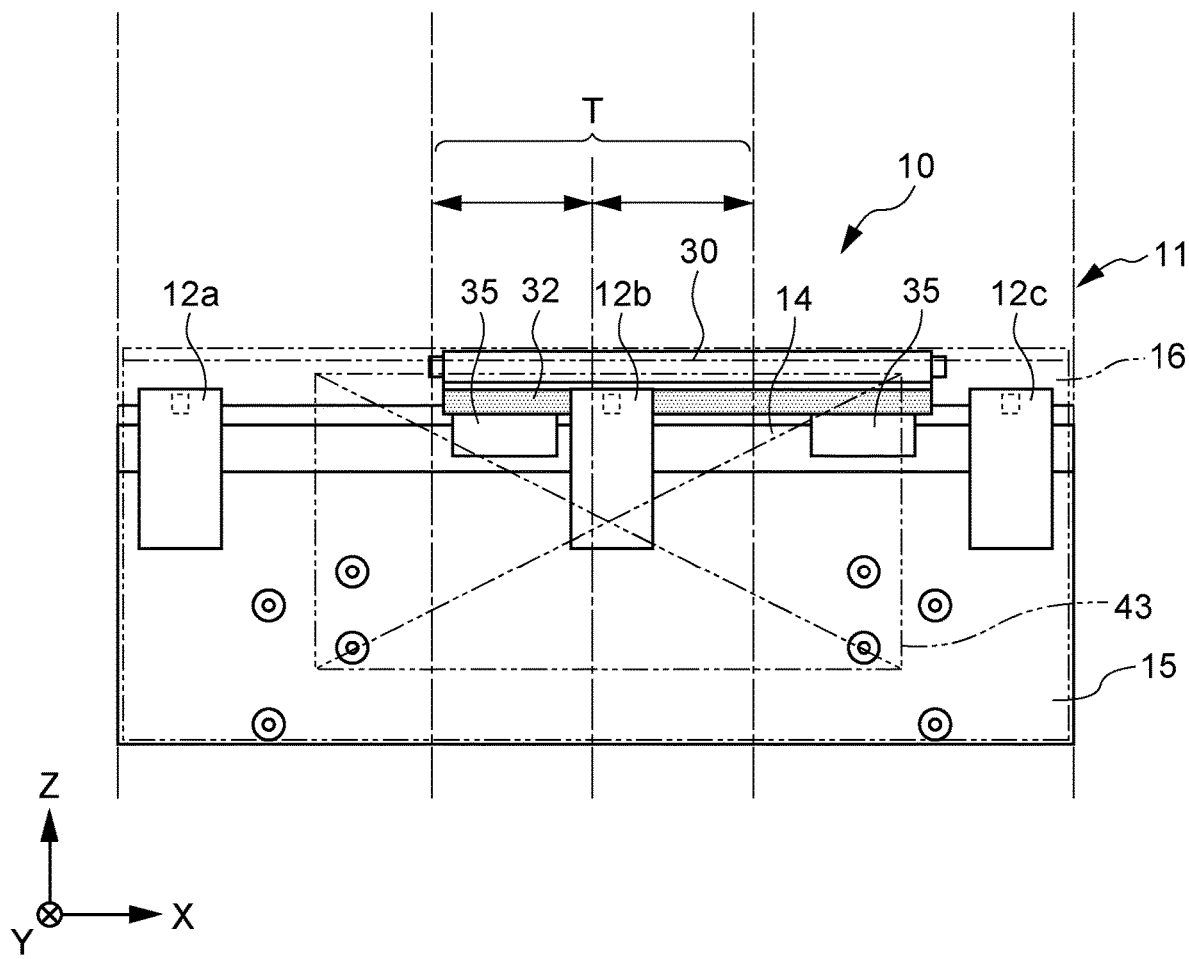
FIG. 3 is a front view illustrating a configuration of the transport apparatus according to the first embodiment of the invention.
Figure 4A:
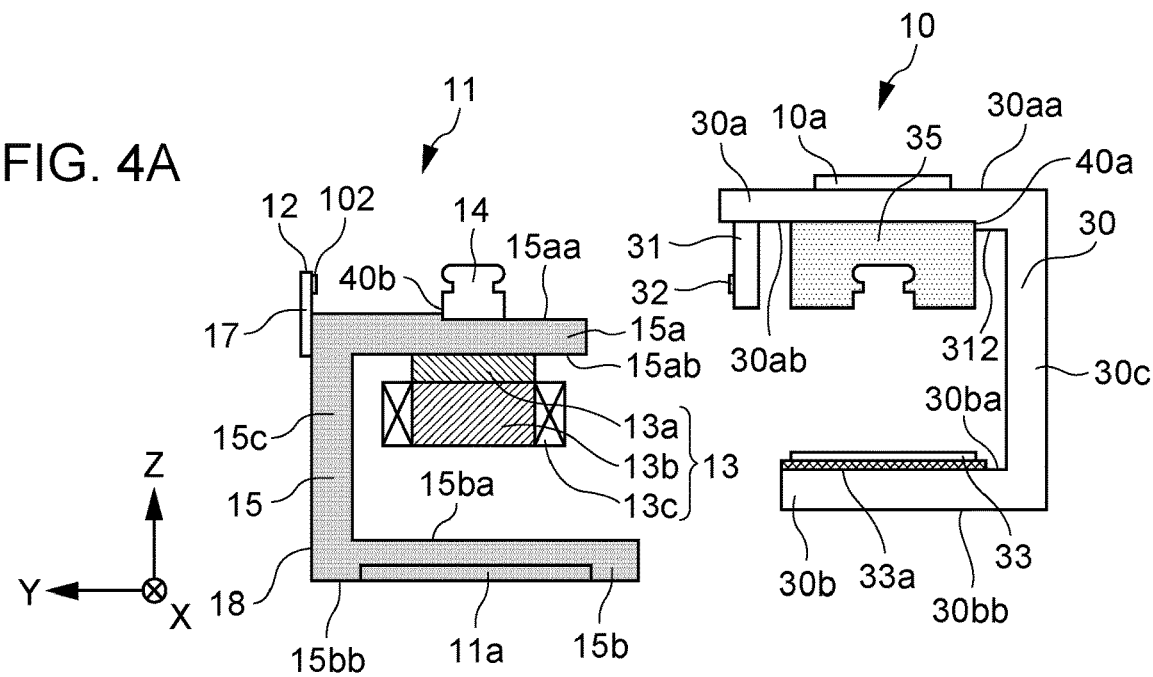
FIGS. 4A to 4C are sectional views illustrating a configuration of the transport apparatus according to the first embodiment of the invention.
Figure 4B:
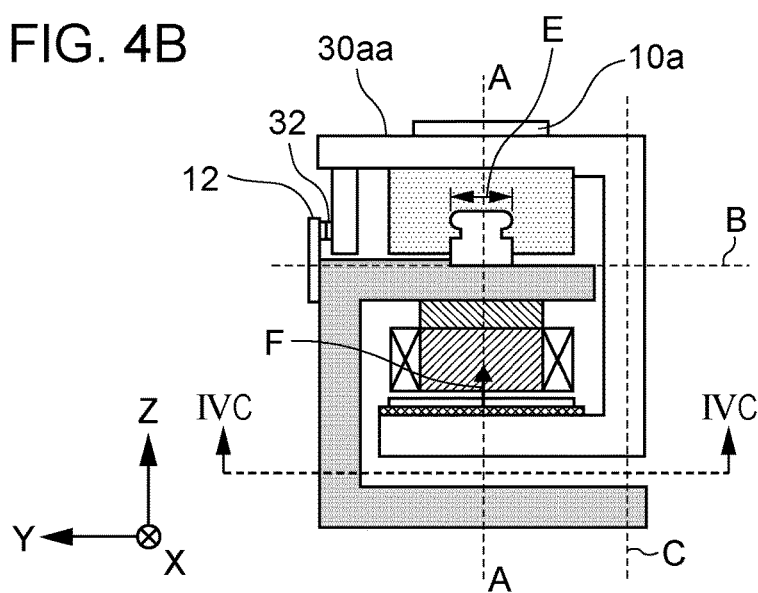
Figure 4C:
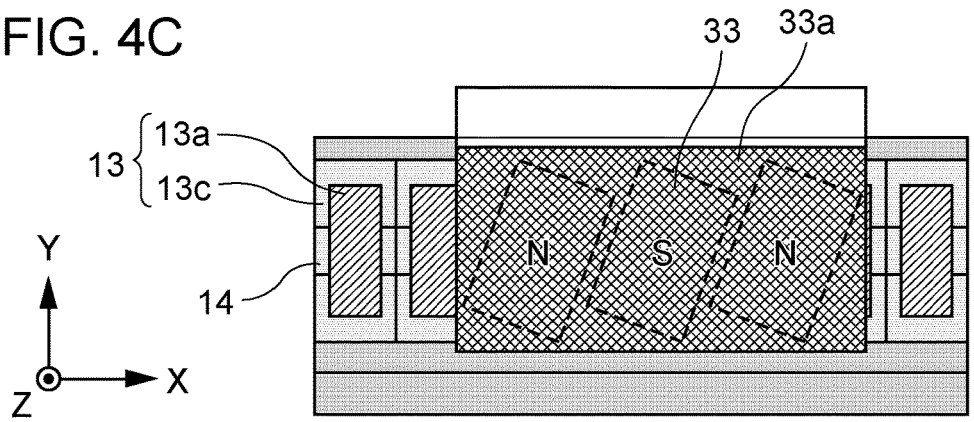

FIG. 2 illustrates the transport apparatus outward path 1 as viewed from the Y direction. FIG. 3 illustrates the transport carriage 10 and the transport modules 11 serving as a part of the transport path, as viewed from the Y direction. FIGS. 4A to 4C are sectional views illustrating configurations of the transport carriage 10 and the transport module 11.

The transport apparatus outward path 1 is configured to be modularized and has the plurality of transport modules 11. The processing system 001 has a plurality of lower controllers 43 that are connected to the plurality of transport modules 11, the carriage transfer apparatus 3, and the carriage transfer apparatus 4 so as to allow communication. The lower controllers 43 control the transport modules 11 or the carriage transfer apparatus 3 or 4, each of which is a connection destination.

Note that, in FIG. 2, for simplification of description, two transport modules 11 are illustrated and two lower controllers 43a and 43b are illustrated as lower controllers 43 connected to the two transport modules 11. Further, lower controllers 43c and 43d are illustrated as lower controllers 43 connected to the carriage transfer apparatus 3. Furthermore, lower controllers 43e and 43f are illustrated as lower controllers 43 connected to the carriage transfer apparatus 4. In the description, as long as particular discrimination is not needed, a lower controller is simply represented as a "lower controller 43". The plurality of lower controllers 43 are connected to a lower controller network 42.

The processing system 001 further has an intermediate controller 41 and a higher controller 40. The intermediate controller 41 is connected to the plurality of lower controllers 43 through the lower controller network 42 so as to allow communication. The intermediate controller 41 controls the plurality of lower controllers 43. The higher controller 40 that transmits an operation command to the intermediate controller 41 is connected to the intermediate controller 41.

As illustrated in FIG. 2, each of the transport modules 11 is installed on a horizontal installation surface of the stand 02. The transport module 11 has a transport module housing 15, encoders 12a, 12b, and 12c, a carriage driving coil 13, and a guide rail 14. A power source (not illustrated) is connected to the lower controllers 43.

The carriage driving coil 13 is provided in the transport module housing 15 along the X direction. The guide rail 14 is installed on the transport module housing 15 along the X direction.

The transport carriage 10 has a carriage base 30, a scale 32, and a guide block 35.

Next, configurations of the transport carriage 10 and the transport module 11 will be described with reference to FIGS. 3 and 4A to 4C. FIG. 4A is a sectional view of the transport module (fixed portion) 11 and the transport carriage (moving portion) 10 taken along a direction parallel to the direction (Y direction) vertical to the transport direction (X direction). FIG. 4B is a sectional view when the transport carriage 10 on the transport module 11 is operated. In the transport module 11, the guide rail 14 that is installed on the transport module 11 and guides the guide block 35 in the transport direction is disposed. The transport module 11 includes the carriage driving coil 13. The transport carriage 10 includes the guide block 35 and a permanent magnet 33.

The transport module 11 that is the fixed portion and a part of the transport path includes the transport module housing 15. The transport carriage 10 that is the moving portion includes the carriage base 30. A workpiece attachment portion 10a is provided on the transport carriage 10. In the present embodiment, both of the carriage base 30 and the transport module housing 15 have a side-opened concave shape. That is, the carriage base 30 has a first part 30a, a second part 30b, and a third part 30c of the moving portion that connects the first part 30a of the moving portion and the second part 30b of the moving portion. The first part 30a is also referred to as a first part of the moving portion. The second part 30b is also referred to as a second part of the moving portion. The third part 30c is also referred to as a third part of the moving portion. The side-opened concave shape is formed so that an opposite side of the third part 30c of the moving portion between the first part 30a of the moving portion and the second part 30b of the moving portion is open. The transport module housing 15 also has a first part 15a, a second part 15b, and a third part 15c of the fixed portion that connects the first part 15a of the fixed portion and the second part 15b of the fixed portion. The first part 15a is also referred to as a first part of the fixed portion. The second part 15b is also referred to a second part of the fixed portion. The side-opened concave shape is formed so that an opposite side of the third part 15c of the fixed portion between the first part 15a of the fixed portion and the second part 15b of the fixed portion is open. Then, the first part 15a of the fixed portion is inserted between the first part 30a of the moving portion and the second part 30b of the moving portion from an opening of the carriage base 30. Thereby, a second surface 30ab of the first part 30a of the moving portion and a first surface 15aa of the first part 15a of the fixed portion are arranged facing each other. A second surface 15ab of the first part 15a of the fixed portion and a first surface 30ba of the second part 30b of the moving portion are arranged facing each other.

Further, the guide block 35 is provided on the second surface 30ab of the first part 30a of the moving portion and the guide rail 14 is provided on the first surface 15aa of the first part 15a of the fixed portion. Since the second surface 30ab of the first part 30a of the moving portion and the first surface 15aa of the first part 15a of the fixed portion are arranged facing each other, the guide block 35 is able to be arranged on the guide rail 14. Thus, the carriage is able to be moved along the guide rail 14. Further, when a plurality of transport modules in each of which the guide rail 14 is arranged along the transport direction are arrayed, the transport carriage 10 is able to be transported by being transferred between the plurality of transport modules.

Two or more guide blocks 35 are installed in series in the transport direction of the carriage base 30. It is desirable that two or more guide blocks 35 are installed because the carriage shakes largely when there is one guide block 35, but stable transport is enabled even with one guide block 35 when the guide block 35 has a long length. For example, when the length of the guide block 35 is a half or more of a length of the carriage base 30 in the transport direction, stable transport is enabled even with one guide block 35.

The workpiece attachment portion 10a is installed on a first surface 30aa on which the guide block 35 is provided and which is opposite to the second surface 30ab of the first part 30a of the moving portion. Such a configuration makes it possible to arrange the workpiece attachment portion at a position closer to the guide block, so that stable transport is enabled while suppressing vibration to the workpiece placed on the workpiece attachment portion as much as possible. It is desirable that the workpiece attachment portion 10a is installed so as to cross an X-Z virtual plane passing through a center of the guide block 35 in the direction (Y direction) vertical to the transport direction (X direction). More desirably, when the workpiece attachment portion 10a is installed so that an X-Z virtual plane passing through a center of the workpiece attachment portion 10a in the direction (Y direction) vertical to the transport direction (X direction) and an X-Z virtual plane passing through the center of the guide block 35 are overlapped, the transport carriage is able to be transported more stably. In FIG. 4B, a state where the respective X-Z virtual planes are overlapped is indicated by a dotted line A-A.

A step portion 40a that extends in the transport direction (X direction) is formed on the second surface 30ab of the first part 30a of the moving portion so that a position at which the guide block 35 is provided is not displaced. The guide block 35 is pressed so as to contact the step portion 40a, the guide block 35 is positioned, and while such a state is kept, the guide block 35 is installed on the transport carriage 10. This makes it possible to easily and correctly install the guide block 35 on the transport carriage 10. The step portion 40a may be formed by processing a step with cutting processing on the second surface 30ab of the first part 30a of the moving portion.

It is more desirable that a step portion 40b for positioning is formed in the guide rail 14 as well. That is, the step portion 40b that extends in the transport direction (X direction) is formed on the first surface 15aa of the first part 15a of the fixed portion. The guide rail 14 is pressed so as to contact the step portion 40b, the guide rail 14 is positioned, and while such a state is kept, the guide rail 14 is installed on the transport module housing 15. This makes it possible to easily and correctly install the guide rail 14 on the transport module housing 15. The step portion 40b may be formed by processing a step with cutting processing on the first surface 15aa of the first part 15a of the fixed portion. In the present embodiment, an example that the guide block 35 is provided on the second surface 30ab of the first part 30a of the moving portion and the guide rail 14 is provided on the first surface 15aa of the first part 15a of the fixed portion is indicted. However, there is no limitation thereto and a guide rail may be provided on the second surface 30ab of the first part 30a of the moving portion and a guide block may be provided on the first surface 15aa of the first part 15a of the fixed portion. A second surface 15bb of the second part 15b of the fixed portion is fixed so as to contact a first surface of the stand 02 (refer to FIG. 2). Without limitation to the stand 02, the second surface 15bb of the second part 15b of the fixed portion may be installed so as to directly contact a floor surface of a building, for example. Herein, a structure that is installed so as to directly contact the second surface 15bb of the second part 15b of the fixed portion is referred to as a base. That is, an installation portion 11a to the base is formed on the second surface 15bb of the second portion 15b of the fixed portion.

Though described in detail below, a plurality of permanent magnets 33 are installed on the first surface 30ba of the second part 30b of the moving portion so as to be arrayed in the X direction. Each of the permanent magnets 33 may include a yoke 33a. The permanent magnet 33 may be installed through a permanent magnet bracket 34. Herein, the permanent magnet bracket 34 and the permanent magnet 33 are collectively referred to as a permanent magnet. The permanent magnet is also referred to simply as a magnet.

The carriage driving coil 13 is installed on the second surface 15ab of the first part 15a of the fixed portion. That is, the guide rail 14 and the carriage driving coil 13 are arranged back-to-back in relation to each other through the first part (first part of the fixed portion) of the transport module housing 15. The carriage driving coil 13 is constituted by, for example, a core-in-winding 13a, a rear core 13b, and a winding 13c. An electromagnetic force that drives the transport carriage 10 is generated between the plurality of permanent magnets 33 installed on the carriage base 30 and the carriage driving coil 13 installed on the transport module housing 15, when current is applied to the carriage driving coil 13. That is, on a surface of the fixed portion that faces the permanent magnets 33, the carriage driving coil 13 that forms a magnetic circuit together with the magnets is disposed. The carriage driving coil is also referred to simply as a coil. The transport carriage 10 is driven by the electromagnetic force generated between the plurality of permanent magnets 33 and the carriage driving coil 13 and is transported along the +X direction on the transport apparatus outward path 1 illustrated in FIG. 1. In this manner, in the present embodiment, the transport system 01 by a moving magnet (MM) linear motor, in which the carriage driving coil 13 does not move but the permanent magnets 33 move, is formed.

FIG. 4C is a bottom sectional perspective view taken along a one-dot chain line IVC-IVC in FIG. 4B. As illustrated in FIG. 4C, the permanent magnets 33 are provided so that a north pole and a south pole are alternately arranged as viewed from the carriage driving coil 13 side in the transport direction (X direction). A plurality of carriage driving coils 13 are also provided to be arrayed in the transport direction.

The carriage driving coils 13 and the permanent magnets 33 are arranged with a fixed gap in a vertical direction. The carriage driving coils 13 are installed to face the vertical direction as viewed from the transport direction in order to transport the transport carriage 10. In general, when a permanent magnet 33 having a high magnetic flux density is selected, a motor thrust is able to be increased. When the core-in-winding 13a having a high permeability is arranged at a center of the winding 13c, the magnetic flux density is able to be increased. On the other hand, when there is a part having a high permeability around the permanent magnet 33, an attractive force is generated between the permanent magnet 33 and the part having the high permeability.

In the configuration of FIG. 4B, an attractive force F of the permanent magnet 33 greatly acts on the core-in-winding 13a arranged in a vicinity thereof. For example, when the permanent magnet 33 is formed of a material of a neodymium magnet and has a size with a yoke 33a of 50×40×5 mm, the attractive force F has several hundreds of newtons when a gap has 1 mm. When a plurality of permanent magnets are used, an attractive force F obtained by multiplying the attractive force F of the permanent magnet 33 by the number of the permanent magnets is applied, so that the carriage base 30 of the transport carriage 10 and the transport module housing 15 of the transport module 11 need great rigidity. In a case where the rigidity is insufficient, when the position of the permanent magnet, the carriage driving coil, the guide block, or the guide rail is deviated even slightly, the attractive force F for guiding causes deformation in the guide rail 14, the guide block 35, the transport module 11, or the transport carriage 10 in some cases. The transport apparatus is configured to allow transfer by connecting guide rails 14 in many cases. In particular, in the transport in which the transport carriage 10 is circulated as illustrated in FIG. 1, the transport carriage 10 moves from the transport module 11 that is fixed to the carriage transfer apparatus 4, and further, the carriage transfer apparatus 4 is operated so that the transport carriage 10 moves from the carriage transfer apparatus 4 to another transport module 11. In this manner, the carriage transfer apparatus 4 moves repeatedly, positioning of the carriage transfer apparatus 4 with respect to the transport module 11 that is fixed is difficult. When the guide rail 14 is deformed, adjustment during the transfer is insufficient to cause a step, so that a lifetime of the guide block 35 is shortened. In particular, between the carriage transfer apparatus 4 and the transport module 11 that is fixed, when the guide rail 14 is deformed, the transport carriage 10 is not able to perform transfer itself due to the step in some cases. When the transport carriage 10 is deformed, there is also a case where a position of a workpiece provided on the transport carriage 10 is deviated or the deformed part of the transport carriage 10 is rubbed against the transport module 11.

As illustrated in FIG. 4B, the present embodiment is configured such that the attractive force F generated between the permanent magnet 33 and the core-in-winding 13a acts in the vertical direction (Z direction) as viewed from the transport direction (X direction) of the guide rail 14 and the guide block 35 through the transport carriage 10. Specifically, the guide block 35 on the transport carriage 10, the guide rail 14 and the carriage driving coil 13 on the transport module 11, and the permanent magnet 33 on the transport carriage 10 are arranged to be arrayed in order in the direction in which the attractive force F acts. That is, these components are arranged so that center positions thereof are overlapped in a sectional surface (Y-Z sectional surface) vertical to the transport direction (X direction). It is desirable that the guide rail 14, the guide block 35, the carriage driving coil 13, and the permanent magnet 33 are arranged so that respective X-Z virtual planes passing through centers thereof in the direction (Y direction) vertical to the transport direction (X direction) are overlapped. A state where the respective X-Z virtual planes are overlapped is indicated by the dotted line A-A in FIG. 4B. Though the overlapping state as indicated by the dotted line A-A is desirable, the guide block 35, the carriage driving coil 13, and the permanent magnet 33 may be arranged so that the respective X-Z virtual planes thereof fall within a range (E) of a width of the guide rail 14. With the arrangement within the range (E) of the width of the guide rail 14, the deformation of the carriage base 30 is suppressed within an allowable range. As the center positions of the components are deviated from the center position of the guide rail 14, more moment in the rolling direction is applied to the guide rail 14 and the deformation of the guide rail 14 is increased. Note that, in general, rolling indicates movement around the axis in the X direction of the transport direction, pitching indicates movement around the axis in the Y direction vertically (laterally) crossing the transport direction, and yawing indicates movement around the axis in the Z direction vertically (longitudinally) crossing the transport direction.

In a case where the guide rail 14 and the guide block 35 are used in combination, load resistance is generally greatest in a vertical direction to a surface where the guide block 35 is installed. The configuration in which the attractive force F is applied in the vertical direction makes it possible to reduce the deformation of the guide rail 14 in the rolling direction. When the deformation of the guide rail 14 is able to be reduced, adjustment of transfer between the transport modules 11 is facilitated. Since the guide rail 14 and the guide block 35 have different lifetimes depending on the direction in which the load is applied, a configuration in which the attractive force F is applied in a direction where an allowable load is large is advantageous from a viewpoint of the lifetimes.

In the configuration of the present embodiment, since the attractive force F acts on the transport carriage 10, the rigidity is increased to reduce a deformation amount of the transport carriage 10 itself. As illustrated in FIG. 4B, the configuration is such that a line (dotted line B) drawn horizontally from the surface of the transport module 11, on which the guide rail 14 is installed, perpendicularly crosses a line (dotted line C) passing through a center of the third part 30c of the transport carriage 10 in a thickness direction. With such a configuration, the guide block 35, the guide rail 14, the carriage driving coil 13, and the permanent magnet 33 that are arranged so that the X-Z virtual planes thereof fall within the range (E) of the width of the guide rail 14 have positions less deviated or directions less changed due to the attractive force F. It is also possible to reduce the force in the rolling direction that acts on the guide rail 14 and the guide block 35. In the present embodiment, the workpiece attachment portion 10a is arranged on a surface of the first part of the transport carriage 10, which is opposite to the surface where the guide block 35 is installed. The workpiece attachment portion 10a is a place where a workpiece, a jig, or the like is attached to allow processing on the transport carriage 10 by a peripheral apparatus. When the deformation of the transport carriage 10 is reduced, deviation or inclination of the workpiece attachment portion 10a installed on the transport carriage 10 is also reduced, thus making it possible to perform a precise work for the workpiece attached to the workpiece attachment portion 10a.

The scale 32 is provided through a scale bracket 31 to an end of the first part 30a of the carriage base 30, which is opposite to the third part 30c, at a position where an encoder 12 is able to detect a position. The scale 32 and the encoder 12 are provided facing each other. The scale 32 has a pattern used for detecting the position of the transport carriage 10. The scale 32 may be directly provided on the first part (first part of the moving portion) of the carriage base 30 without through the scale bracket 31, and the scale bracket 31 and the scale 32 are collectively referred to also as a scale herein.

An external side surface of the third part 15c of the transport module housing 15 is set as an encoder installation surface 18. On the encoder installation surface 18, the encoder 12 is installed through an encoder bracket (sensor installation member) 17. The encoder 12 is adjusted so that an encoder detecting unit 102 that is a scale reading unit of the encoder is arranged facing the scale by the encoder bracket (sensor installation member) 17. The encoder 12 is installed on the encoder installation surface 18 through the encoder bracket 17. Though an example that three encoders are provided is indicated in the present embodiment, there is no limitation thereto. An encoder may be directly installed without through the encoder bracket 17, and the encoder bracket 17 and the encoder 12 are collectively referred to also as an encoder herein. Though a mode in which a position of the moving portion is detected by using the encoder and the scale will be described in the present embodiment, there is no limitation thereto and a known sensor capable of detecting positions of the fixed portion and the moving portion is able to be used. Herein, a member installed on the moving portion is referred to as a scale and a member installed on the fixed portion is referred to as an encoder or a sensor.

In a case where merely precise position control is performed, an optical or magnetic sensor having a high resolution is desired to be selected. The sensor having a high resolution requires adjustment to reduce a relative deviation between the scale 17 and the encoder detecting unit 102. In the present embodiment, the sensor is installed on a side of the first part 30a of the carriage base 30, which is opposite to the third part 30c with the guide block 35 therebetween. This is because the deformation caused by the permanent magnet 33 installed on the second part 30b of the carriage base 30 is suppressed by the guide block 35. When the sensor is installed on the third part 30c side (for example, 312) of the first part 30a of the carriage base 30, there is a deviation in the scale due to the deformation of the carriage base 30 caused by the permanent magnet 33 and accuracy of positioning is reduced. However, the side of the first part 30a of the carriage base 30, which is opposite to the third part 30c side with the guide block 35 therebetween, is held by the guide block 35 and the guide rail 14 that have high rigidity, and thus there is almost no influence of the deformation. Thus, by installing the sensor on the side of the first part 30a of the carriage base 30, which is opposite to the third part 30c with the guide block 35 therebetween, it is possible to suppress the deformation due to the attractive force F and reduce the deviation in position detection.

Second Embodiment

Figure 5:
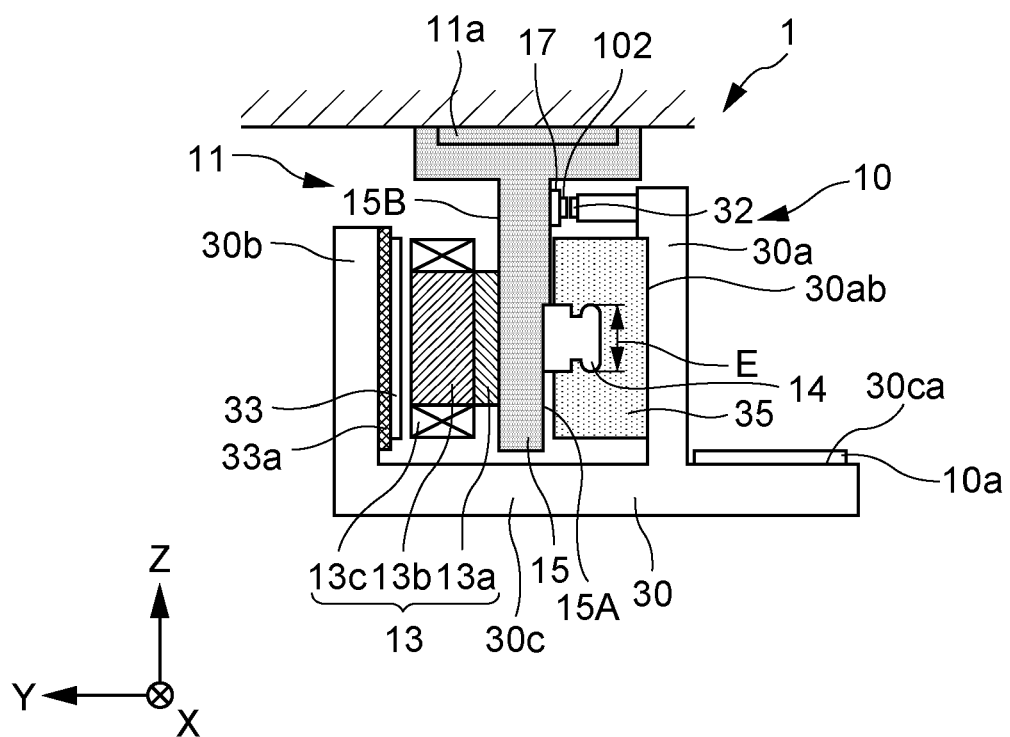
FIG. 5 illustrates a second embodiment of the invention.

FIG. 5 is a sectional view illustrating configurations of the transport carriage 10 and the transport module 11 according to a second embodiment. A member having the same configuration as that of the first embodiment will be given the same reference sign and description thereof will be omitted. In the first embodiment, an example that the guide block 35, the carriage driving coil 13, and the permanent magnet 33 fall within the range (E) of the width of the guide rail 14 are installed so that the respective X-Z virtual planes thereof fall within the range (E) of the width of the guide rail 14 and the Z direction of each of the X-Z virtual planes faces a gravitational direction is indicated. In the present embodiment, indicated is an example that the guide block 35, the carriage driving coil 13, and the permanent magnet 33 are installed in the same manner so that respective virtual planes thereof fall within the range (E) of the width of the guide rail 14, however, in a case where the Z direction is the gravitational direction, the virtual planes are not X-Z virtual planes as in the first embodiment but are X-Y planes each facing a direction that is not the gravitational direction.

Also in a case of such a configuration, the transport carriage 10 that is the moving portion includes the carriage base 30. The workpiece attachment portion 10a is provided on the transport carriage 10. In the present embodiment, the carriage base 30 has a side-opened F-shape. The transport module housing 15 has a T-shape. Specifically, the carriage base 30 has the first part 30a, the second part 30b, and the third part 30c of the moving portion that connects the first part 30a of the moving portion and the second part 30b of the moving portion and extends longer than the first part 30a. The first part 30a is also referred to as a first part of the moving portion. The second part 30b is also referred to as a second part of the moving portion. The third part 30c is also referred to as a third part of the moving portion. The side-opened F-shape is formed so that an opposite side of the third part 30c of the moving portion between the first part 30a of the moving portion and the second part 30b of the moving portion is open. The transport module housing 15 has a fixed portion in a T-shape. Then, the fixed portion is inserted between the first part 30a of the moving portion and the second part 30b of the moving portion from an opening of the carriage base 30. Thereby, the second surface 30ab of the first part 30a of the moving portion and the first surface 15aa of the fixed portion are arranged facing each other. The second surface 15ab of the fixed portion and the first surface 30ba of the second part 30b of the moving portion are arranged facing each other.

Further, the guide block 35 is provided on the second surface 30ab of the first part 30a of the moving portion and the guide rail 14 is provided on the first surface 15aa of the fixed portion. Since the second surface 30ab of the first part 30a of the moving portion and the first surface 15aa of the fixed portion are arranged facing each other, the guide block 35 is able to be arranged on the guide rail 14. Thus, the carriage is able to be moved along the guide rail 14. Further, when a plurality of transport modules in each of which the guide rail 14 is arranged along the transport direction are arrayed, the transport carriage 10 is able to be transported by being transferred between the plurality of transport modules.

In the fixed portion, the installation portion 11a for installing the fixed portion on a ceiling part (referred to as a base) of a building, for example, is formed.

In the present embodiment, an example that the transport apparatus 1 hangs from the ceiling is indicated. With such a configuration, a space is able to be secured under the transport apparatus 1, thus enabling space saving.

Third Embodiment

Next, an example of a transport apparatus capable of detecting a correct position even when a housing is deformed due to thermal expansion of a carriage driving coil will be described as a third embodiment. A member having the same configuration as those of the first and second embodiments will be given the same reference sign and description thereof will be omitted. First, thermal expansion of the transport module 11 explained in FIGS. 2, 3, and 4A to 4C will be specifically described with reference to FIGS. 6A and 6B.

Figure 6A:
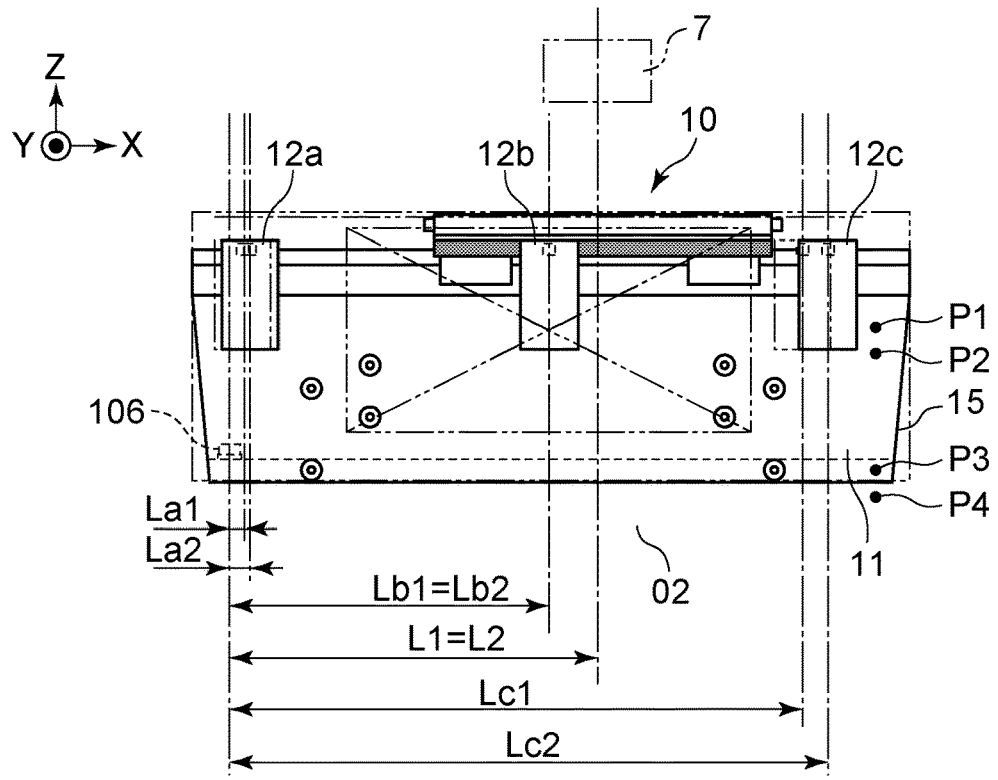
FIGS. 6A and 6B respectively illustrate thermal expansion of a housing according to a third embodiment and a fourth embodiment of the invention.

FIG. 6A illustrates thermal expansion of the transport module housing 15 of the transport module 11 in the third embodiment.

The carriage driving coil 13 (not illustrated) generates heat by energization to operate the transport carriage 10. By continuously operating the transport carriage 10, the heat of the carriage driving coil 13 is transmitted to the stand 02 through the transport module housing 15 or radiated to the peripheral air contacting the carriage driving coil 13, the transport module housing 15, a cover 16 (not illustrated), or the like, so that a stationary state with the apparatus in operation is brought at a given temperature.

The transport module housing 15 thermally expands due to a temperature rise caused by the heat generation of the carriage driving coil 13. Because of the thermal expansion of the transport module housing 15, positions of the encoders 12a and 12c installed at ends of the transport module housing 15 change from positions before the thermal expansion. When the positions of the encoders 12a and 12c change, a detected position of the transport carriage 10, which is detected by detecting units of the encoders 12a and 12c, also changes.

The stand 02 has a sufficiently large volume and heat capacity and a sufficiently large heat radiation area with respect to a total amount of the heat generated by the carriage driving coil 13. That is, the stand 02 is able to suppress a temperature rise between a stopped state and a continuous operation state to a very slight amount. Specifically, since the temperature rise of the stand 02 is very slight, a degree of the thermal expansion of the stand 02 is also very slight.

Figure 8:
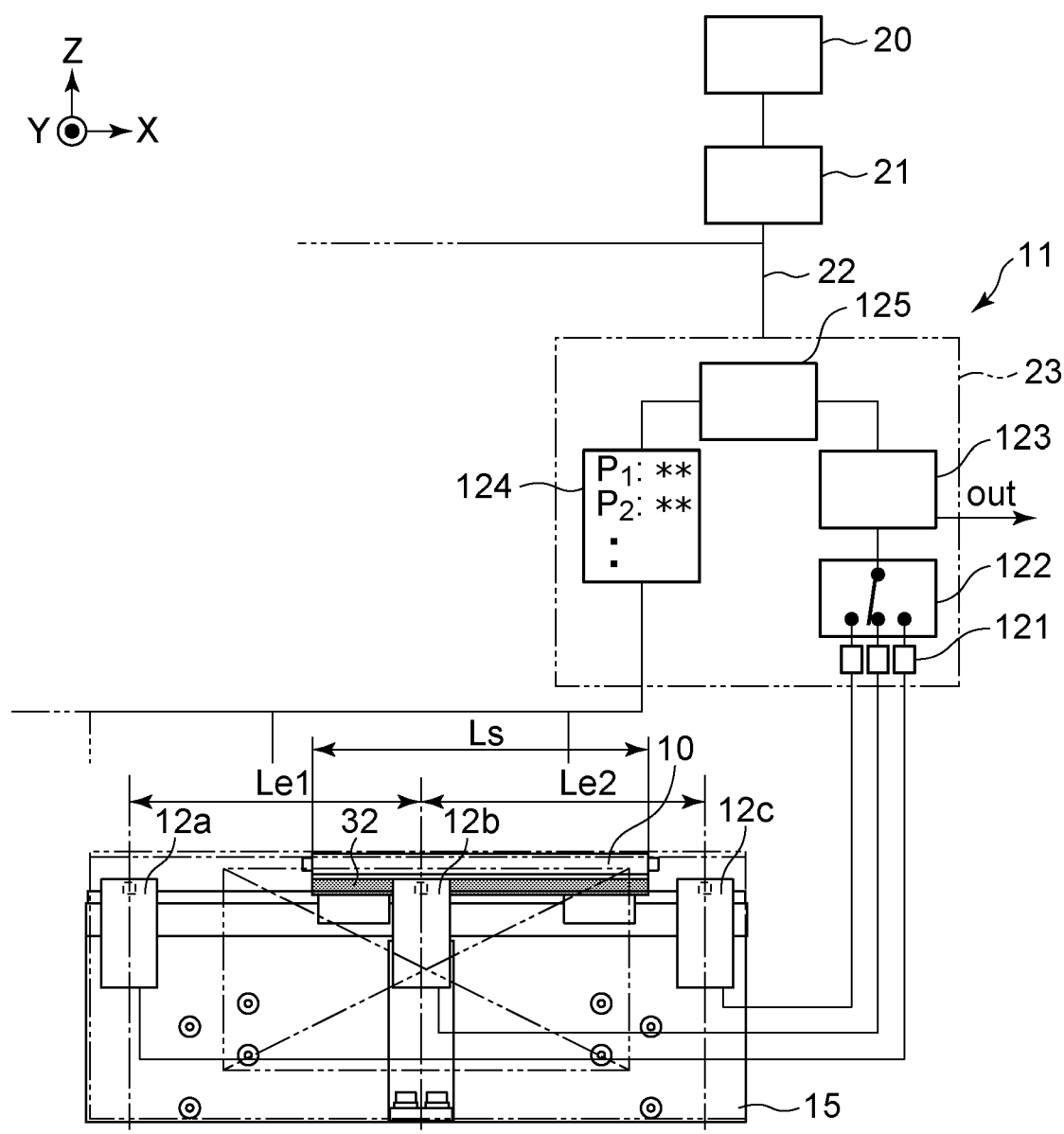
FIG. 8 is an explanatory view of a storage unit according to the third embodiment of the invention.

The transport module housing 15 is fixed to the stand 02 at a plurality of places by screws or the like. The shape of the transport module housing 15 is the side-opened concave shape as described above. The carriage driving coil 13 is installed on an upper part of the transport module housing 15 and a lower surface of a lower part of the transport module housing 15 contacts the stand 02. That is, since the heat is radiated from the lower part of the transport module housing 15 to the stand 02, the transport module housing 15 thermally expands in a fan-like shape as schematically illustrated in FIG. 8. Specifically, while a length of the lower part of the transport module housing 15 is not much changed, an upper part thereof extends longer toward both sides from a center due to the thermal expansion.

Figure 6B:
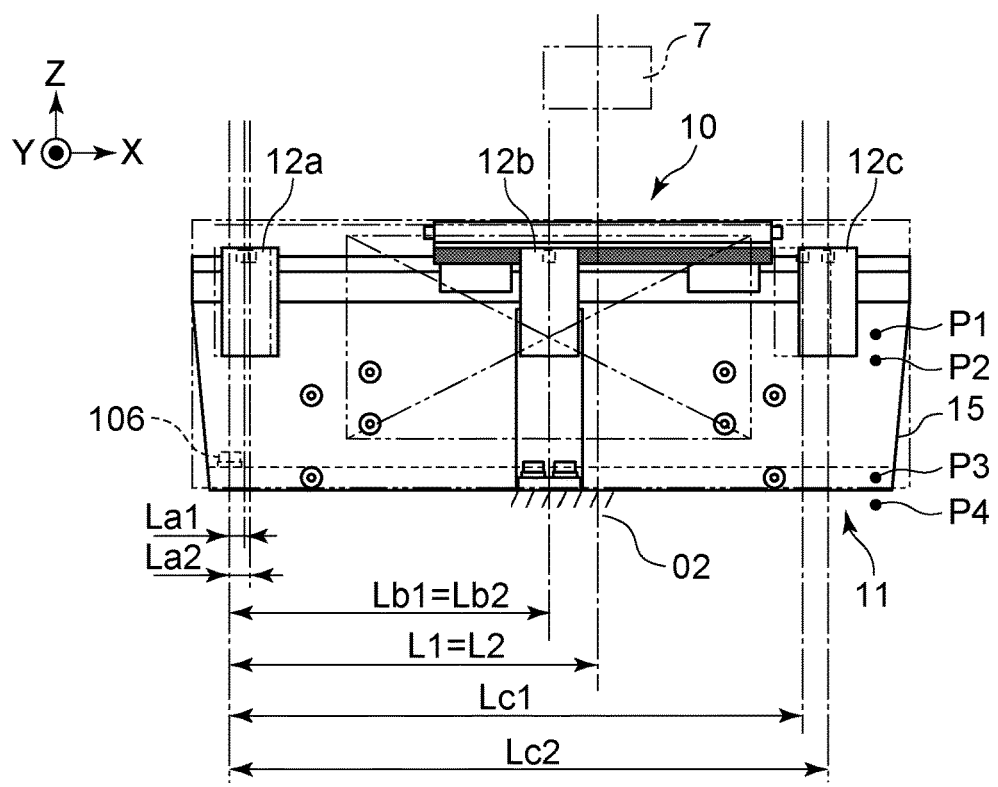

In FIGS. 6A and 6B, a base point of thermal expansion of the housing is set as a housing thermal expansion base point 106. As a distance in the X direction between the housing thermal expansion base point 106 and the encoder 12a, a distance when the apparatus is stopped is set as a distance La1 with an encoder a stopped and a distance in a stationary state with the apparatus in operation is set as a distance La2 with the encoder a in operation. As a distance in the X direction between the housing thermal expansion base point 106 and the encoder 12b, a distance when the apparatus is stopped is set as a distance Lb1 with an encoder b stopped and a distance in a stationary state with the apparatus in operation is set as a distance Lb2 with the encoder b in operation. As a distance in the X direction between the housing thermal expansion base point 106 and the encoder 12c, a distance when the apparatus is stopped is set as a distance Lc1 with an encoder c stopped and a distance in a stationary state with the apparatus in operation is set as a distance Lc2 with the encoder c in operation. As a distance in the X direction between the housing thermal expansion base point 106 and the processing apparatus 7, a distance when the apparatus is stopped is set as a distance L1 with the processing apparatus stopped and a distance in a stationary state with the apparatus in operation is set as a distance L2 with the processing apparatus in operation.

Next, a relationship between thermal expansion of the transport module 11 and an apparatus operation state in the third embodiment of the invention will be described with reference to FIG. 7.

Figure 7:
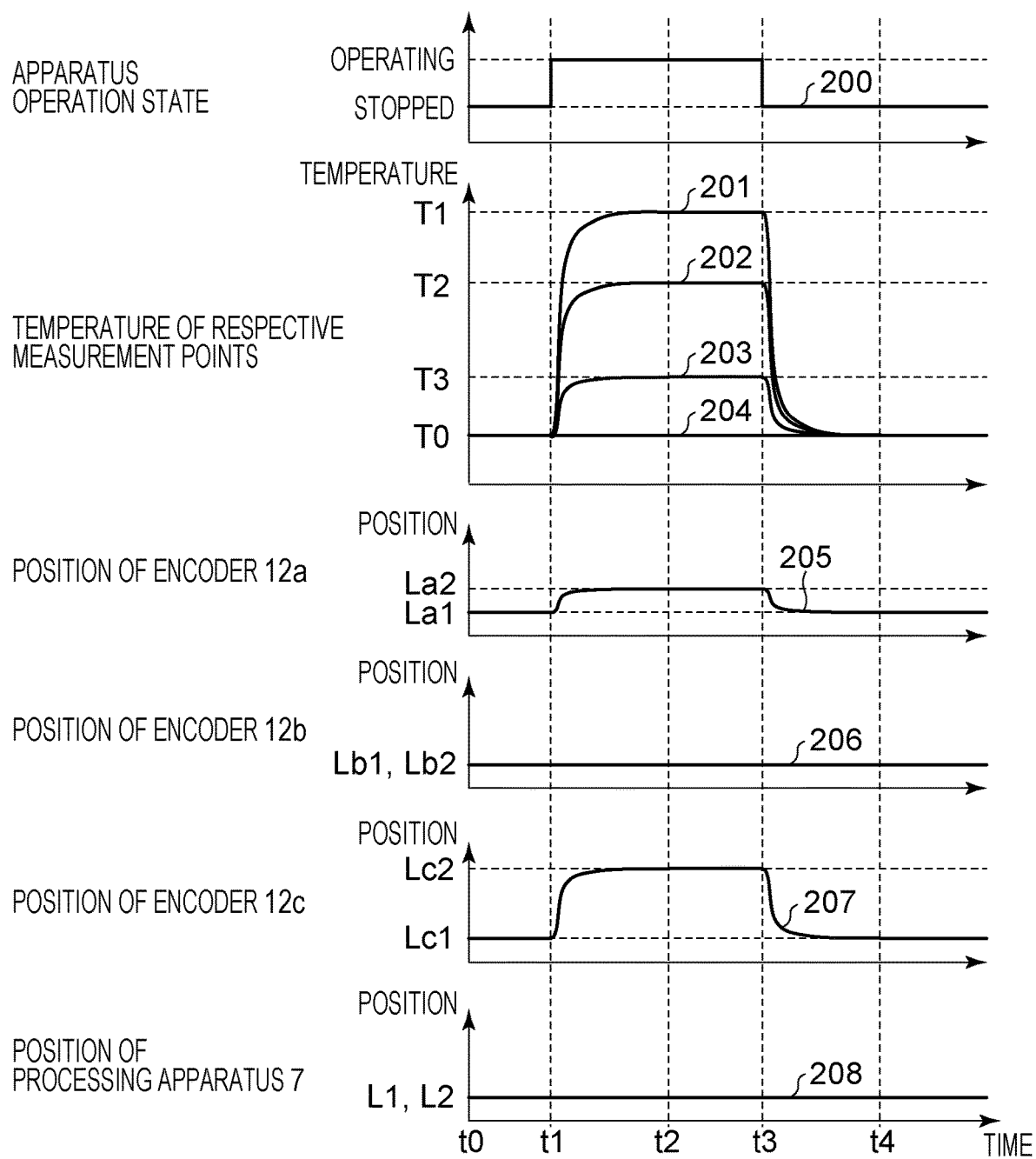
FIG. 7 illustrates a relationship between a housing temperature and thermal expansion according to the third embodiment of the invention.

FIG. 7 illustrates a relationship between a housing temperature and thermal expansion in the third embodiment of the invention.

The apparatus operation state is indicated by an apparatus operation state timing chart 200. Temperatures of a coil temperature measurement point P1, a housing upper part temperature measurement point P2, a housing lower part temperature measurement point P3, and a stand temperature measurement point P4 that are described in FIGS. 6A and 6B are respectively set as a coil temperature 201, a housing upper part temperature 202, a housing lower part temperature 203, and a stand temperature 204. A position 205 is a position of the encoder 12a in the X direction, a position 206 is a position of the encoder 12b in the X direction, a position 207 is a position of the encoder 12c in the X direction, and a position 208 is a position of the processing apparatus 7 in the X direction.

A time t0 is an initial time, a time t1 is an apparatus operation start time, a time t2 is a stationary state reach time with the apparatus in operation, a time t3 is an apparatus stopped time, and a time t4 is a stationary state reach time with the apparatus stopped.

A temperature T0 is set as an environment temperature, a temperature of the coil temperature measurement point P1 in the stationary state with the apparatus in operation is set as a stationary temperature T1 with the coil in operation, a temperature of the housing upper part temperature measurement point P2 is set as a stationary temperature T2 with the housing upper part in operation, and a temperature of the housing lower part measurement point P3 is set as a stationary temperature T3 with the housing lower part in operation.

The respective temperatures of the coil temperature measurement point P1, the housing upper part temperature measurement point P2, the housing lower part temperature measurement point P3, and the base temperature measurement point P4 at the initial time t0 are all equal to the environment temperature T0. This is because the initial time t0 is a time before current is applied to the carriage driving coil 13 and there is no influence of heat generation of the carriage driving coil 13.

When the apparatus is brought into an operating state at the apparatus operation start time t1, the carriage driving coil 13 generates heat, and the temperatures of the respective temperature measurement points start to increase gradually. Thereafter, when a fixed time has lapsed and the stationary state reach time t2 with the apparatus in operation is reached, the stationary temperature T1 with the coil in operation, the stationary temperature T2 with the housing upper part in operation, and the stationary temperature T3 with the housing lower part in operation are reached. The temperature of the stand temperature measurement point P4 at this time is T0.

Further, when the apparatus stopped time t3 is reached and the apparatus is stopped, the temperatures of the respective measurement points start to be reduced gradually. Thereafter, when a fixed time has lapsed and the stationary state reach time t4 with the apparatus stopped is reached, all the temperatures become equal to the environment temperature T0.

A relation between the coil temperature 201, the housing upper part temperature 202, the housing lower part temperature 203, and the stand temperature 204 at each time is indicated as the following formula.

$$201 \geq 202 \geq 203 \geq 204 \quad (1)$$

Since the temperatures of the respective measurement points increase due to the heat generation of the carriage driving coil 13, a temperature at a part closer to the carriage driving coil 13 is increased, and the temperature is gradually reduced as farther from the part by heat resistance of the transport module housing 15.

Next, a relationship of the positions of the encoders 12a, 12b, and 12c at each time will be described.

After the apparatus operation start time t1 has lapsed, in accordance with the increase in the temperatures of the respective portions, the transport module housing 15 thermally expands and the positions of the encoders 12a and 12c change. When the stationary state reach time t2 with the apparatus in operation is reached, the increase in the temperatures of the respective portions stops and the temperatures are fixed, so that the change in the positions also stops. When a linear expansion coefficient of the transport module housing 15 is α, the following formulas are satisfied.

$$La2-La1=\alpha(T2-T0)La1 \quad (2)$$

$$Lc2-Lc1=\alpha(T2-T0)Lc1 \quad (3)$$

The formula (2) is a formula indicating the position of the encoder 12a and the formula (3) is a formula indicating the position of the encoder 12c. Here, the stationary temperature T2 with the housing upper part in operation in the formula (2) and the formula (3) is provided because the encoder installation surface 18 for the encoder bracket 17, on which the encoders 12a and 12c are installed, is provided near the housing upper part temperature measurement point P2 of the transport module housing 15.

On the other hand, after the apparatus operation start time t1 has lapsed, in accordance with the increase in the temperatures of the respective portions, the transport module housing 15 thermally expands and the positions of the encoder 12b and the processing apparatus 7 change, but the encoder 12b is at a center part of the deformation of the fan-like shape and thus does not change or changes very slightly. Moreover, since the processing apparatus 7 is installed on the stand 02 and the thermal expansion of the stand 02 is very slight, the position of the processing apparatus 7 does not change or changes very slightly. Accordingly, the following formulas are satisfied.

$$Lb2-Lb1=0 \quad (4)$$

$$L2-L1=0 \quad (5)$$

Here, when La2−La1 is ΔLa, Lb2−Lb1 is ΔLb, Lc2−Lc1 is ΔLc, and L2−L1 is ΔL, changes of relative position relationships of the encoders 12a, 12b, and 12c and the processing apparatus 7 from the initial time t0 to the stationary state reach time t2 with the apparatus in operation are indicated by the following formulas.

$$\Delta La-\Delta L=\Delta La-0=\Delta La \quad (6)$$

$$\Delta Lb-\Delta L=0-0=0 \quad (7)$$

$$\Delta Lc-\Delta L=\Delta Lc-0=\Delta Lc \quad (8)$$

The formula (6) represents a positional relationship between the encoder 12a and the processing apparatus 7, the formula (7) represents a positional relationship between the encoder 12b and the processing apparatus 7, and the formula (8) represents a positional relationship between the encoder 12c and the processing apparatus 7. When an assembly adjustment work such as teaching is performed at the initial time t0 and then the stationary state reach time t2 with the apparatus in operation is reached, the positional relationship between the encoder and the processing apparatus 7 is collapsed as in the formulas (6) and (8), and it becomes difficult to perform a precise processing work or the like for the workpiece on the transport carriage 10.

Normally, an assembly adjustment work such as teaching is not performed while the transport carriage 10 is continuously operated. That is, such an assembly adjustment work is performed in a state where the carriage driving coil 13 does not generate heat and before the transport module housing 15 thermally expands and in a state of the initial time t0. In a case where such adjustment is performed, position detection of a position where the processing apparatus 7 is stopped in the transport carriage 10 is performed by the encoders 12a and 12c. Then, a position that is taught during the assembly adjustment work is different from a position where the carriage is stopped, when the processing apparatus 7 actually performs processing for the workpiece for production, that is, at the stationary state reach time t2 with the apparatus in operation.

As another case, a method that a continuous operation of the transport carriage 10 is performed in advance before assembly adjustment such as teaching, the carriage driving coil 13 is caused to generate heat, and a teaching work is performed after the state reaches a stationary state is also considered. However, it is required that the teaching work is started after the transport carriage 10 is stopped and the teaching work is completed before the carriage driving coil 13 is naturally cooled. Thus, in a case where a precise assembly adjustment work of the processing apparatus 7 needs to be performed with the teaching work, it is difficult to complete all the assembly adjustment works before the carriage driving coil 13 is naturally cooled.

On the other hand, when position detection of a position where the processing apparatus 7 is stopped in the transport carriage 10 is performed by the encoder 12b, there is no relative positional change from the initial time t0 to the stationary state reach time t2 with the apparatus in operation. Thus, regardless of the temperature of the carriage driving coil 13, a precise processing work or the like by the processing apparatus 7 is able to be performed for the workpiece on the transport carriage 10.

The actual temperature increase of the stand 02 in the apparatus operation state is not 0 strictly, and the temperature increases although the increase is very small. Thus, it is more effective when an installation part of the encoder bracket 17b is made closer to an installation part of the processing apparatus 7 as much as possible.

Fourth Embodiment

Next, configurations of the transport carriage 10 and the transport module 11 in a fourth embodiment of the invention will be described with reference to FIG. 6B. A member having the same configuration as those of the first to third embodiments will be given the same reference sign and description thereof will be omitted.

Here, a difference from the third embodiment will be described, and the same component as that of the third embodiment will be given the same reference sign and description thereof will be omitted. First, a configuration of the transport carriage 10 is the same as that of the third embodiment.

Next, a difference of the transport module 11 from that of the third embodiment will be described.

The transport module 11 includes three encoders 12a, 12b, and 12c, and the encoders 12a and 12c are installed on the encoder installation surface 18 (illustrated in FIG. 4A) that is the external side surface of the transport module housing 15. Since the encoder 12b is installed on an encoder external installation portion 2101 provided on the stand 02, a configuration is such that the transport module housing 15 is not affected by thermal expansion.

The encoder external installation portion 2101 is provided on a base (stand 02) and all components that constitute the processing system 001 which includes the transport module housing 15, the encoder bracket 17b, and the processing apparatus 7 are installed on the stand 02. Though the encoder external installation portion 2101 is provided on the stand 02 in the fourth embodiment, without limitation thereto, the encoder external installation portion 2101 may be provided directly on a floor surface, for example.

When the transport carriage 10 on the transport module 11 is continuously operated, the carriage driving coil 13 generates heat and the transport module housing 15 thermally expands, so that positions of the encoders 12a and 12c change. On the other hand, the position of the encoder 12b that is provided on the base through the encoder external installation portion 2101 does not change and is kept at the position before the transport carriage 10 is continuously operated.

In FIG. 8, a sensor interface 121, an encoder input switching unit 122, a servo controller 123, an encoder installation pitch storage unit 124, and an arithmetic operation controller 125 are functional parts of the lower controller 43.

The encoder input switching unit 122 selects an appropriate encoder 12 in accordance with a current position of the transport carriage 10 and inputs position information. On the basis of the position information, the server controller 123 outputs driving current to the carriage driving coil 13.

When the transport carriage 10 enters the transport module 11 from another transport module (not illustrated) that is adjacent thereto in the −X direction (left direction in the figure), the encoder 12a reads position information of the scale 32 on the transport carriage 10 and an operation of the transport carriage 10 is controlled.

When the transport carriage 10 is further operated in the +X direction (right direction in the figure) and passes through a predetermined position, the encoder input switching unit 122 performs switching to position detection by the encoder 12b. Further, when the transport carriage 10 is operated in the X direction and passes through a predetermined position, the encoder input switching unit 122 performs switching to position detection by the encoder 12c.

An installation interval between the encoder 12a and the encoder 12b is set as an encoder installation pitch Le1 and an installation interval between the encoder 12b and the encoder 12c is set as an encoder installation pitch Le2. The encoder installation pitch Le1 and the encoder installation pitch Le2 gradually change as the transport module housing 15 thermally expands.

When a length of the scale 32 on the transport carriage 10 is a scale length Ls, a configuration with the following relation of formulas is provided.

$$Le1<Ls \tag{9}$$

$$Le2<Ls \tag{10}$$

In a relation where the formula (9) and the formula (10) are satisfied, positions of the encoders 12a and 12b and positions of the encoders 12b and 12c are able to be detected at the same time by one scale 32. By detecting the positions at the same time, the encoder installation pitch Le1 and the encoder installation pitch Le2 are able to be measured.

While the positions of the encoders 12a and 12c change due to the thermal expansion of the transport module housing 15, the encoder 12b is not affected by the thermal expansion of the transport module housing 15. Thus, by monitoring changes of the encoder installation pitch Le1 and the encoder installation pitch Le2, it is possible to monitor positional changes of the encoders 12a and 12c with respect to the encoder 12b.

In assembly adjustment and teaching of the transport module 11, the encoder installation pitches Le1 and Le2 are measured by the scale 32 of the transport carriage 10. Measurement values at that time are stored in the encoder installation pitch storage unit 124. By considering a difference between the values of the encoder installation pitches Le1 and Le2 that are stored in the encoder installation pitch storage unit 124 and values of the encoder installation pitches Le1 and Le2 that are measured during an operation of the transport carriage 10, the arithmetic operation controller 125 generates an operation command of the transport carriage 10.

In order for the encoder 12 to correctly detect position information of the scale 32, precise position adjustment, such as gap management or height alignment, for the encoder 12 and the scale 32 is required. Thus, it is essentially ideal that the encoder 12 is directly arranged in the transport module housing 15. In particular, in a case where a plurality of transport modules 11 are connected to form a long transport path or a case where a plurality of transport carriages 10 are provided, a large number of processes for assembly adjustment is required for the position adjustment of the encoder 12. Then, the encoder installation pitch storage unit 124 monitors the encoders 12a and 12c installed on the transport module housing 15 with the encoder 12b installed on the encoder external installation portion 2101 as a reference. Thereby, it is possible to achieve both reduction in the number of processes for assembly adjustment and a configuration in which a whole area of the transport module 11 is not affected by thermal expansion.

Fifth Embodiment

Next, configurations of the transport carriage 10 and the transport module 11 in a fifth embodiment of the invention will be described with reference to FIGS. 9 and 10. A member having the same configuration as those of the first to fourth embodiments will be given the same reference sign and description thereof will be omitted.

Figure 9:
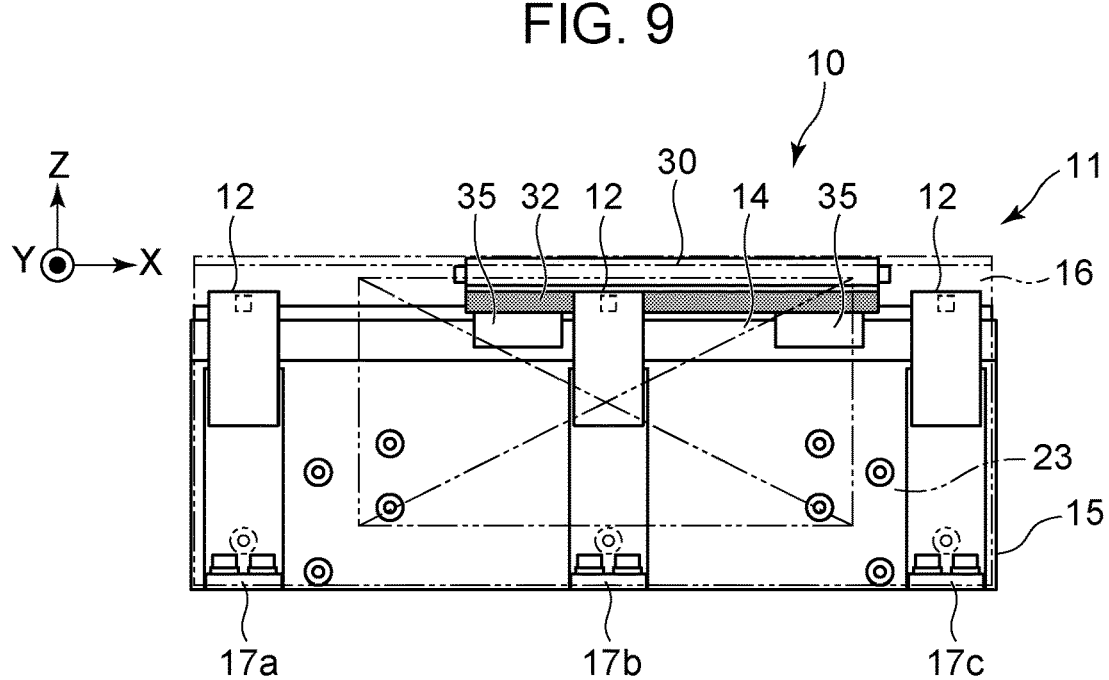
FIG. 9 is a front view illustrating a configuration of a transport apparatus according to a fifth embodiment of the invention.
Figure 10:
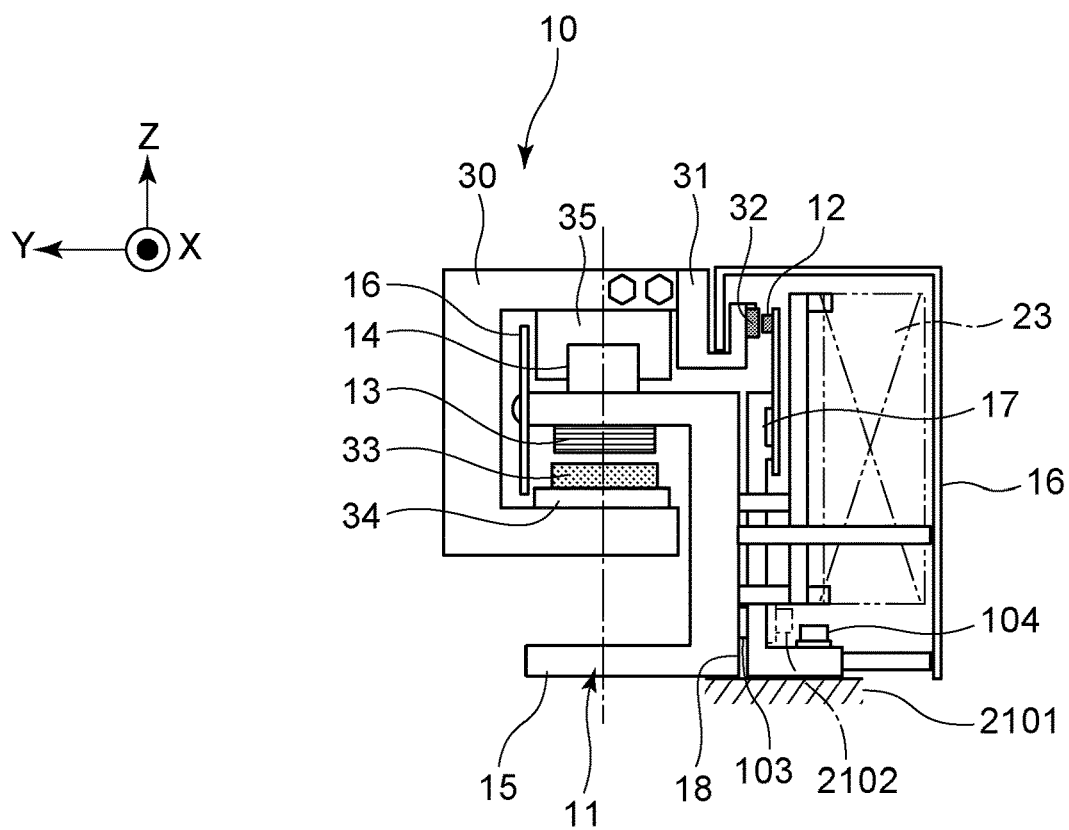
FIG. 10 is a sectional view illustrating a configuration of the transport apparatus according to the fifth embodiment of the invention.

FIG. 9 is a front view illustrating a configuration of a transport apparatus according to the fifth embodiment of the invention and FIG. 10 is a sectional view illustrating a configuration of the transport apparatus according to the fifth embodiment of the invention.

Here, a difference from the third embodiment will be described, and the same component as that of the third embodiment will be given the same reference sign and description thereof will be omitted. First, the configuration of the transport carriage 10 is the same as that of the third embodiment.

A great difference of the transport module 11 from that of the third embodiment is that all the three encoders 12 are installed on the encoder external installation portion 2101 provided on the base. That is, a configuration is such that the whole area of the transport module 11 is not affected by thermal expansion of the transport module housing 15 due to heat generation of the carriage driving coil 13. The encoder is installed on the transport module housing 15 through a thermal displacement alleviating portion such as a slip spacer.

In FIG. 10, a slip spacer 103 is installed in a state of being held between the external side surface 18 of the side part of the transport module housing 15 and the encoder bracket 17. A temporarily fixing member 2102 is a member that temporarily fixes the encoder bracket 17 and the slip spacer 103 to the external side surface 18 of the side part of the transport module housing 15. A fixing member 104 is a member that fixes the encoder bracket 17 to the encoder external installation portion 2101.

In assembly adjustment of the transport module 11, first, by making the encoder bracket 17 contact the external side surface 18 of the side part of the transport module housing 15 through the slip spacer 103, the scale 32 and the encoder 12 are able to be subjected to assembly adjustment to a predetermined gap. Next, an installation position of the encoder 12 with respect to the encoder bracket 17 in the Z direction is subjected to assembly adjustment in accordance with the scale 32. When the assembly adjustment is completed, the encoder bracket 17 is temporarily fixed to the external side surface 18 of the side part of the transport module housing 15 by the temporarily fixing member 2102.

In a state where the encoder bracket 17 is temporarily fixed to the external side surface 18 of the side part of the transport module housing 15, the transport module housing 15 is placed at a predetermined installation position on the base such as the stand 02. Then, after performing relative position adjustment or the like with respect to a peripheral apparatus such as an adjacent transport module 11 or the processing apparatus 7, the transport module housing 15 is fixed to the stand 02. Then, the temporarily fixing member 2102 is removed, and finally, the encoder bracket 17 is fixed to the encoder external installation portion 2101 by the fixing member 104.

In assembly adjustment of the processing system 001, the transport module 11 and the processing apparatus 7 are often subjected to a unit assembly adjustment work in advance for each unit on a working stand or the like where the assembly adjustment work is easily performed. After that, the transport module 11 and the processing apparatus 7 subjected to the unit assembly adjustment work are mounted on the stand 02 and a work such as relative position adjustment is performed for each of them.

During the unit assembly adjustment work of the transport module 11, the position of the encoder 12 with respect to the transport module housing 15 in the transport module 11 is adjusted, thus making it possible to reduce a total number of processes for the assembly adjustment. Though management such as storage or transport is performed till when the unit assembly adjustment work is completed and the transport module 11 and the processing apparatus 7 are mounted on the stand 02, it is troublesome to manage the transport module 11 separately from the encoder 12 and the encoder bracket 17. Thus, the management is facilitated by connection with use of the temporarily fixing member 2102.

Further, the transport module housing 15 and the encoder bracket 17 contact with each other through the slip spacer 103, but are not fixed. When the transport module housing 15 thermally expands due to heat generation of the carriage driving coil 13, slipping is caused between the slip spacer 103, and the transport module housing 15 and the encoder bracket 17. The encoder bracket 17 is fixed to the encoder external installation portion 2101, and is thus not affected by the thermal expansion of the transport module housing 15.

A material of the slip spacer is not particularly limited, but a resin material or a ceramic material that has excellent sliding performance and high heat insulating property is desirably used.

Sixth Embodiment

Next, configurations of the transport carriage 10 and the transport module 11 in a sixth embodiment of the invention will be described with reference to FIGS. 11 and 12. A member having the same configuration as those of the first to fifth embodiments will be given the same reference sign and description thereof will be omitted.

Figure 11:
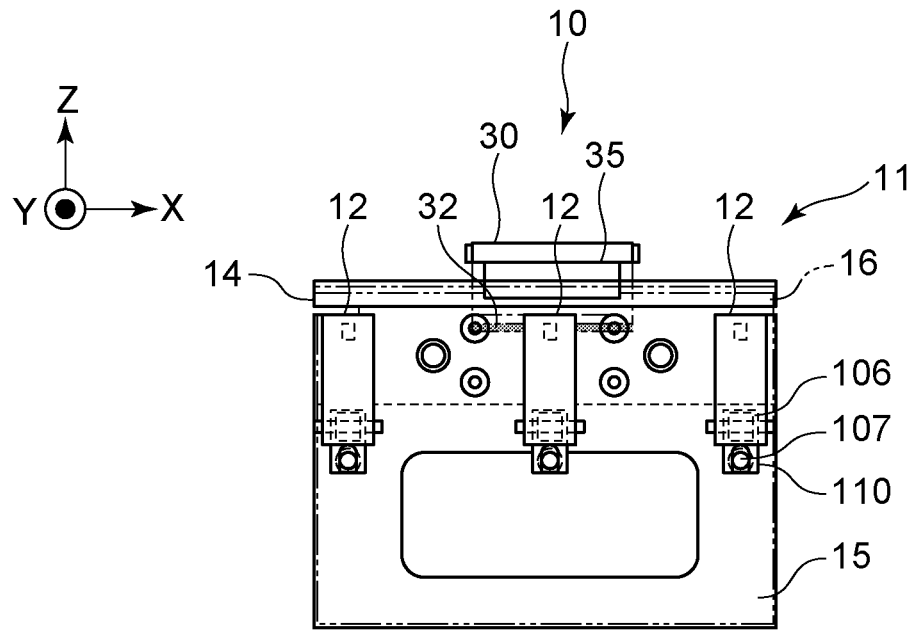
FIG. 11 is a front view illustrating a configuration of a transport apparatus according to a sixth embodiment of the invention.
Figure 12:
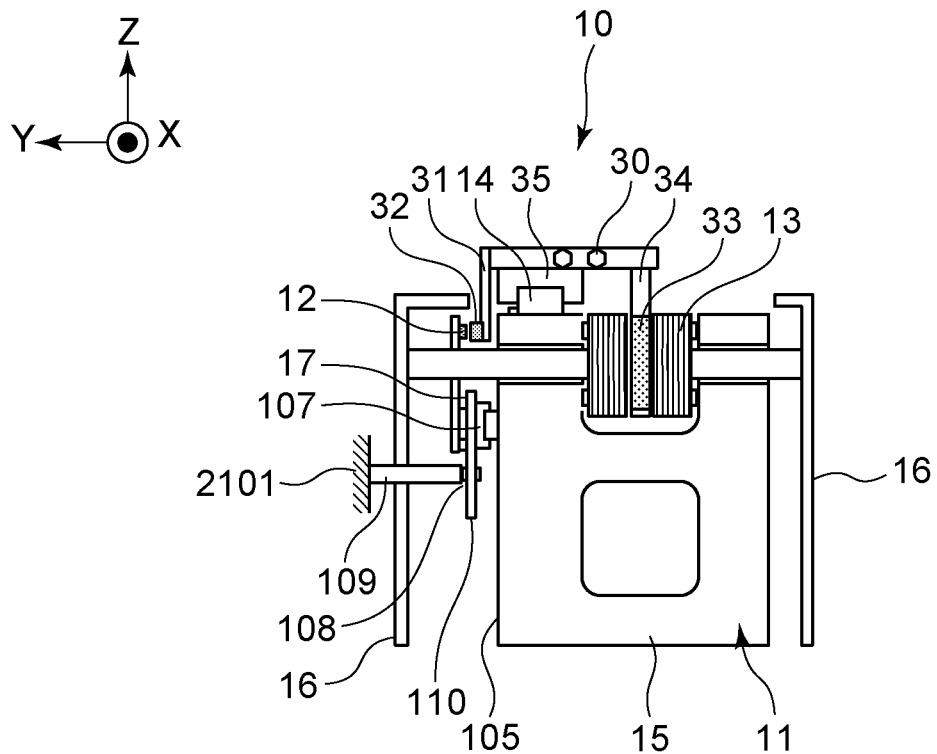
FIG. 12 is a sectional view illustrating a configuration of the transport apparatus according to the sixth embodiment of the invention.

FIG. 11 is a front view illustrating a configuration of a transport apparatus according to the sixth embodiment of the invention. FIG. 12 is a sectional view illustrating a configuration of the transport apparatus according to the sixth embodiment of the invention.

In the transport module 11, a pair of carriage driving coils 13 are installed so as to face an inner wall of the transport module housing 15 that has a top-opened concave structure. A configuration is such that the permanent magnet 33 and the permanent magnet bracket 34 that are installed on the transport carriage 10 pass through a space between the pair of carriage driving coils 13.

The encoder 12 is installed on an encoder installation surface 105 of the transport module housing 15 through the encoder bracket 17. An example that three encoders are provided in one transport module 11 is indicated in FIG. 11, but the number of encoders is not limited thereto as long as at least one or more encoders are provided.

The guide block 35 and the permanent magnet bracket 34 are provided on a lower surface of the carriage base 30 to form a T-shape structure. The scale 32 is installed on a side surface of the carriage base 30 through the scale bracket 31.

The encoder bracket 17 and a fitting member 110 are installed on a liner-motion guide 107 installed on the encoder installation surface 105 and the linear-motion guide 107 enables motion in a direction along the X direction.

A cam follower 108 that is fitted into the fitting member 110 to regulate a position in the X direction is installed in a connecting member 109 and the connecting member 109 is installed on the encoder external installation portion 2101 which is separated from the transport module housing 15 and provided on the base such as the stand 02.

Here, in a part where the fitting member 110 and the cam follower 108 are fitted, it is desirable that the fitting is performed without a gap, so that a configuration in which an eccentric cam follower, a gap adjustment mechanism, or the like is provided and gap adjustment is able to be performed is desired.

In such a configuration, when an operation of the transport carriage 10 starts and the carriage driving coils 13 generate heat, the transport module housing 15 thermally expands. When the transport module housing 15 thermally expands, the linear-motion guide 107 is operated. The position of the encoder 12 in the X direction is fixed by the encoder eternal installation portion 2101, and is thus not affected by the thermal expansion of the transport module housing 15. That is, the linear-motion guide 107 functions as a thermal displacement alleviating portion.

Since the encoder 12 is installed on the encoder installation surface 105 in directions other than the X direction, it is possible to position the encoder 12 and the scale 32 also by stack-up of part tolerance or the like and the number of processes for assembly adjustment is able to be reduced.

Further, by measuring and storing the encoder installation pitches Le1 and Le2 of the encoders 12 by the method described in the fourth embodiment, adjustment of the installation position in the X direction also becomes unnecessary.

A method of providing the encoder external installation portion 2101 not in the stand 02 but in the processing apparatus 7 is also considered. In this case, it is possible to eliminate influence of thermal expansion due to a minute increase in the temperature of the stand 02 and it is expected to be more effective.

Seventh Embodiment

Next, a configuration of a seventh embodiment of the invention will be described. In the present embodiment, an example of the embodiment in which a failure of position detection due to contamination or the like of an encoder is suppressed will be described. A member having the same configuration as those of the first to sixth embodiments will be given the same reference sign and description thereof will be omitted.

FIGS. 13A to 13G each illustrate the transport apparatus outward path 1 and an operation of the carriage transfer apparatus 4 according to the seventh embodiment of the invention. Though a connecting part of the transport apparatus outward path 1 and the carriage transfer apparatus 4 will be described in the present explanation, the same is also applied to a connecting part of the transport apparatus homeward path 2 and the carriage transfer apparatus 3 illustrated in FIG. 1.

Figure 13A:
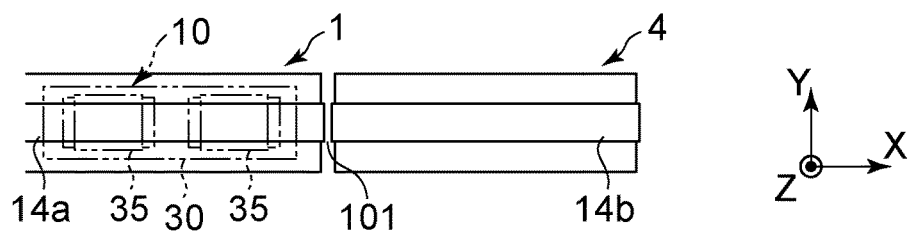
FIGS. 13A to 13G each illustrate a transport apparatus outward path and an operation of a carriage transfer apparatus according to a seventh embodiment of the invention.
Figure 13B:
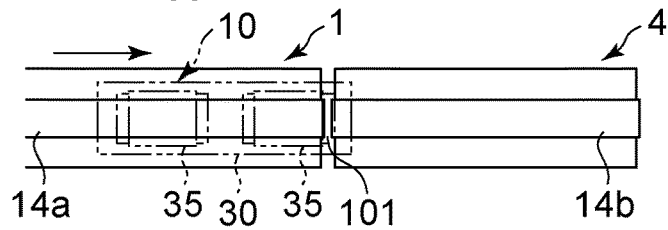
Figure 13C:
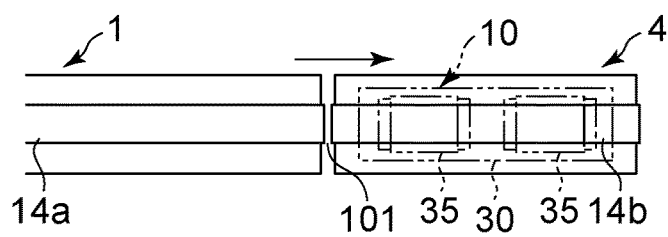
Figure 13D:
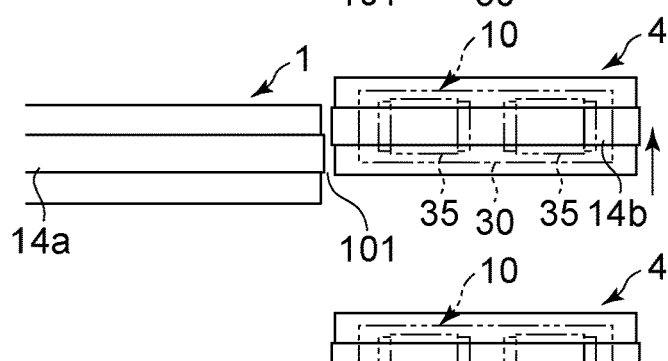
Figure 13E:
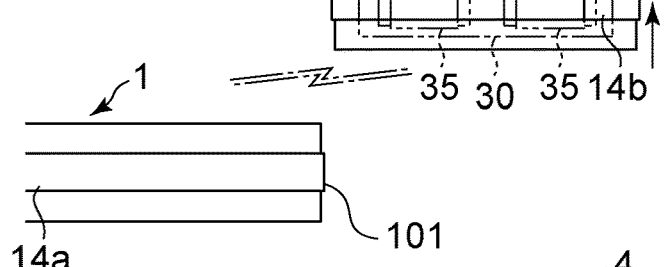
Figure 13F:
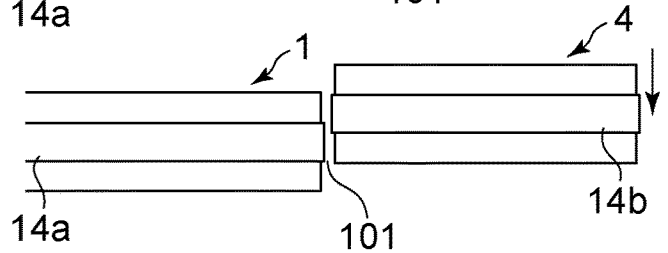
Figure 13G:
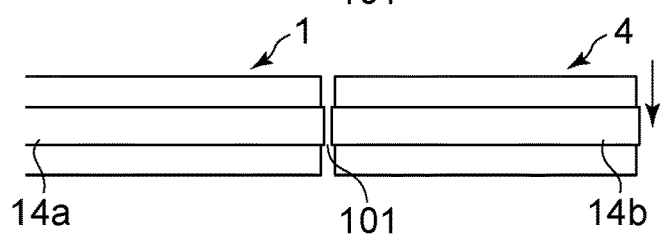

FIG. 13A illustrates a connected state of the transport apparatus outward path 1 and the carriage transfer apparatus 4. FIG. 13B illustrates a state where a transfer operation of the transport carriage 10 from the transport apparatus outward path 1 to the carriage transfer apparatus 4 is performed. FIG. 13C illustrates a transfer completion state of the transport carriage 10 from the transport apparatus outward path 1 to the carriage transfer apparatus 4. FIG. 13D illustrates a state where a separating operation of the carriage transfer apparatus 4 from the transport apparatus outward path 1 is performed. FIG. 13E illustrates a separated state of the carriage transfer apparatus 4 from the transport apparatus outward path 1. FIG. 13F illustrates a state where a connecting operation of the transport apparatus outward path 1 and the carriage transfer apparatus 4 is performed. FIG. 13G illustrates a connected state of the transport apparatus outward path 1 and the carriage transfer apparatus 4.

In the connected state of the transport apparatus outward path 1 and the carriage transfer apparatus 4 in FIGS. 13A to 13C, the transport carriage 10 smoothly performs a transfer operation by a guide rail connecting portion 101. Thus, precise position adjustment is required for a step and a gap between a transport apparatus outward path guide rail 14a and a carriage transfer apparatus guide rail 14b. In the present embodiment, an example that the adjustment is performed so that a size of the step in the Y direction and the Z direction is within 20 µm and a size of the gap in the X direction is within 500 µm. Note that, in the following description, the guide rails 14 are represented as "guide rails 14" as long as particular discrimination is not needed and represented as the "transport apparatus outward path guide rail 14a" and the "carriage transfer apparatus guide rail 14b" when discrimination is needed.

The guide block 35 and the guide rails 14 have a structure in which a ball or roller that is a rolling bearing and incorporated inside the guide block 35 rolls on raceway surfaces of the guide rails 14 to thereby guide a linear motion operation.

Thus, the guide rails 14 are coated with a lubricant for allowing smooth sliding in an entire area where the transport carriage 10 is operated. In the guide block 35, a sealing material (not illustrated) or a scraper material (not illustrated) is installed for the purpose of suppressing a foreign substance or the like entering into the guide block 35 or holding the lubricant filled inside the guide block 35.

When the guide block 35 moves on the guide rails 14 coated with the lubricant, the sealing material or the scraper material collects the lubricant coated on the guide rails 14, so that the lubricant is gradually deposited on an end part of the moving operation of the guide block 35. In particular, lubricating grease that has high viscosity and is used for the purpose of reducing scattering to circumference is notably deposited on the end part of the moving operation.

Normally, the grease deposited on the end part of the moving operation causes few problems. However, in the case of the transport system 01 of FIG. 1, the lubricant collected by the guide block 35 enters into a gap provided in the guide rail connecting portion 101 and is deposited on ends of the guide rails 14. Since the guide rail connecting portion 101 is adjusted with a minute gap of about 500 µm, the deposited lubricant gradually fills the gap of the guide rail connecting portion 101.

In such a state, the carriage transfer apparatus 4 starts to be operated in a direction orthogonal to the transport direction of the transport carriage 10 in order to transfer the transport carriage 10 as in FIG. 13D, the lubricant deposited on the guide rail connecting portion 101 is separated in the operation direction of the carriage transfer apparatus 4. The separated lubricant scatters to circumference and causes contamination.

Further, as in FIGS. 13E and 13F, the transfer of the transport carriage 10 is completed and the carriage transfer apparatus 4 is returned to a connecting position with the transport apparatus outward path 1. Then, an operation is performed in such a manner that the grease deposited on ends of the transport apparatus outward path guide rail 14a and the carriage transfer apparatus guide rail 14b is pushed back to the gap of 500 µm again. At this time, the lubricant that is not able to be returned and is pushed out scatters to circumference.

As described above, compared to a case where the guide block 35 is operated on the continuous guide rail 14, in the case of the transport system 01 including the guide rail connecting portion 101, influence of the grease scattering to circumference of the guide rail connecting portion 101 appears significantly.

The guide rails 14 are installed on a top surface of the transport module housing 15, and by an operation of the carriage transfer apparatus 4, the lubricant deposited on the guide rail connecting portion 101 scatters to circumference.

On the other hand, there is a linear actuator having a configuration in which operation guiding is performed by one guide rail 14 as in the embodiment of the invention. In this case, because of an attractive force between the carriage driving coil 13 and the magnet 33 or because of an inertial force of a workpiece holding mechanism (not illustrated), the guide block 35 receives a rotary force while the transport carriage 10 moves. With the rotary force, the transport carriage 10 is deformed with the guide block 35 as a center. When the transport carriage 10 is deformed, a positional relationship between the scale 32 and the encoder 12 or an installation state changes, resulting that reading precision is adversely affected.

In order to prevent deterioration of reading precision due to the deformation of the transport carriage 10, the guide block 35 and the scale 32 need to be installed as close as possible. In the embodiment of the invention, an installation distance between the guide block 35 and the scale 32 is set to be equal to or less than the width of the guide rail 14.

In a case where the guide block 35 and the scale 32 on the transport carriage 10 are installed so as to be close to each other as described above, the guide rail 14 and the encoder 12 are also installed so as to be close to each other. As a result, a configuration is such that the encoder 12 is easily affected by scattering of the lubricant of the guide rail connecting portion 101.

Note that, though the present embodiment provides a configuration of installation in which the detecting unit of the encoder 12 faces the guide rail 14 side, a configuration of installation in which a surface of the scale 32 faces the guide rail 14 side is also considered. In such a case, the configuration is such that the scale 32 is easily affected by scattering of the lubricant of the guide rail connecting portion 101.

When the carriage transfer apparatus 4 moves, the lubricant deposited on the guide rail connecting portion 101 scatters. The scattered lubricant falls in a gravitational downward direction while taking a parabolic locus because of the gravity. Thus, when the encoder detecting unit 102 is installed at a position higher than a height of the guide rail 14, a structure in which the lubricant is difficult to be attached is able to be achieved.

Note that, though description has been given for the guide rail connecting portion 101 in the embodiment of the invention, a part where the guide rail 14 is continuously installed is also able to prevent the lubricant from being attached to the detecting unit of the encoder. That is, an effect of the present embodiment is able to be obtained all over a movement range of the transport carriage 10.

Eighth Embodiment

Next, detailed structures of the transport module 11 and the transport carriage 10 in an eighth embodiment of the invention will be described with reference to FIGS. 14A and 14B. A member having the same configuration as those of the first to seventh embodiments will be given the same reference sign and description thereof will be omitted.

Figure 14A:
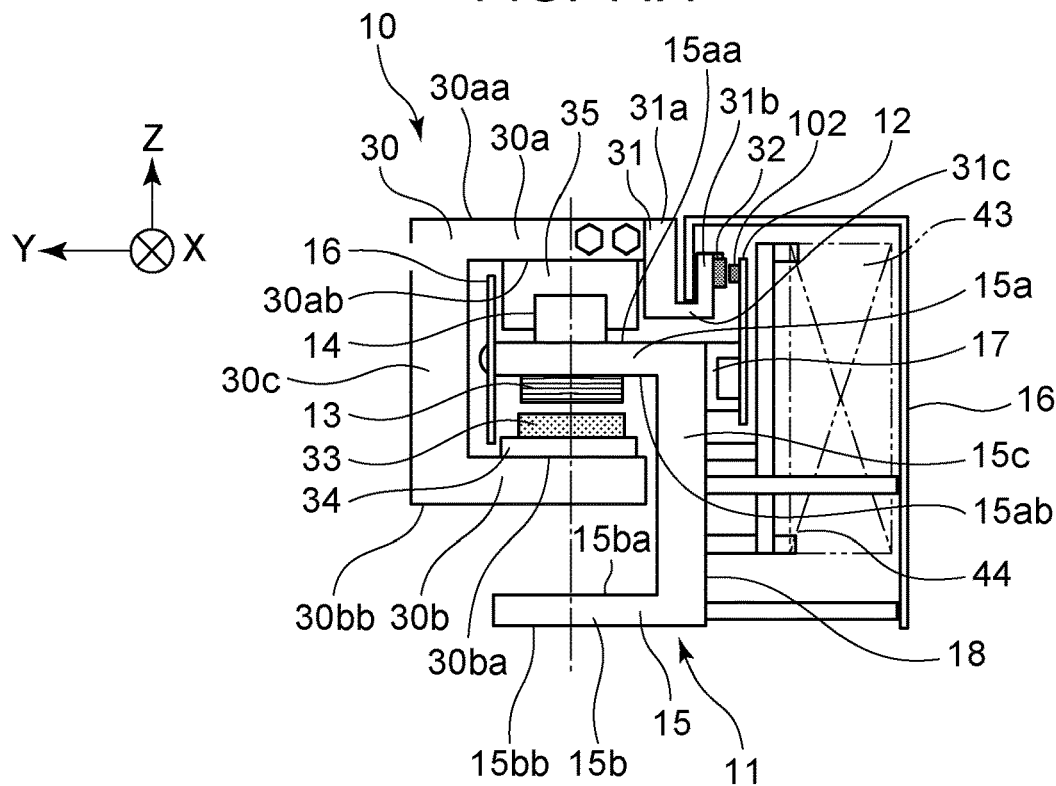
FIGS. 14A and 14B are schematic views illustrating a configuration of a transport apparatus according to an eighth embodiment of the invention.
Figure 14B:
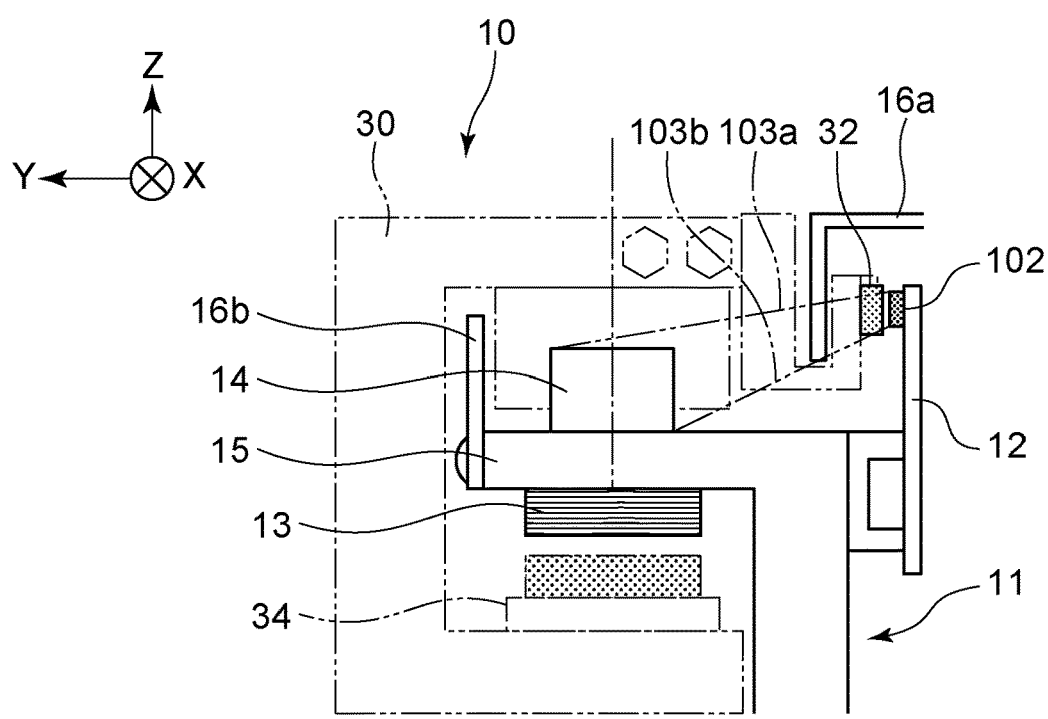

FIG. 14A is a detailed sectional view illustrating a configuration of a transport apparatus according to the eighth embodiment and FIG. 14B is a partial enlarged view of a sectional surface of the transport module 11 of FIG. 14A taken along a plane (Y-Z plane) vertical to at least the movement direction (X direction) of the transport carriage 10. In FIG. 14B, since the transport carriage 10 moves on the transport module 11, the transport carriage 10 is positioned on the transport module 11 in some cases and is not positioned on the transport module 11 in other cases. Therefore, a part of the transport carriage 10 is described with a two-dotted dash line.

The encoder detecting unit 102 is used for the encoder 12 to read position information of the scale 32. When the encoder detecting unit 102 is at a close distance from the guide rail connecting portion 101, the lubricant scatters with an almost linear locus and is attached to the encoder detecting unit 102 in some cases.

Straight lines 103a,b indicate straight lines connecting the guide rail 14 and the encoder detecting unit 102 at ends in a range where the guide rail 14 faces the encoder detecting unit 102. That is, a range surrounded by a part of the guide rail 14 and a part of the encoder detecting unit 102, which face each other, and the straight lines 103a,b indicate a main scattering path of the lubricant coated on the guide rail 14 to the encoder detecting unit 102. Specifically, in the sectional surface illustrated in FIG. 14B, the range is between a straight line 103a connecting an upper end of the encoder detecting unit 102 and an upper end of the guide rail 14, which is opposite to the encoder, and a straight line 103b connecting a lower end of the encoder detecting unit 102 and a lower end of the guide rail 14, which is on the encoder side. By installing a cover 16a so as to block the scattering path of the lubricant to the encoder detecting unit 102, it is possible to further prevent the lubricant from being attached to the encoder detecting unit 102. In other words, the cover 16a is installed on a straight line connecting the guide rail 14 and the encoder detecting unit 102. This makes it possible to prevent the lubricant from being attached to the encoder detecting unit 102.

In a case where the lubricant scatters higher than the straight line 103a, the lubricant is considered to fall from above the encoder detecting unit 102 and be attached to the encoder detecting unit 102. Thus, it is more effective to cover also an upper part of the encoder detecting unit 102 with the cover 16a. An effect of the present embodiment is obtained as long as the cover 16a is installed on at least a part (parts of 12a, 12b, and 12c in FIG. 3) where the encoder detecting unit 102 is. However, it is much more effective when the cover 16a is installed over the entire transport module 11 (from a left end to a right end of the transport module housing 15 in FIG. 3).

On the other hand, the scale of the transport carriage 10 is installed, through a scale installation member, in the first part 30a of the carriage base 30 of the transport carriage 10 at a position where the encoder 12 is able to detect a position. The scale installation member is desired to have a top-opened concave shape that has a first part 31a, a second part 31b, and a third part 31c that connects the first part 31a and the second part 31b. When the transport carriage 10 is configured so as to move with the cover 16a held between the first part 31a and the second part 31b, a cover 16b is able to be installed on a straight line connecting the guide rail 14 and the encoder detecting unit 102.

Ninth Embodiment

Next, configurations of the transport carriage 10 and the transport module 11 in a ninth embodiment of the invention will be described with reference to FIGS. 15, 16A, and 16B. A member having the same configuration as those of the first to eighth embodiments will be given the same reference sign and description thereof will be omitted.

Figure 15:
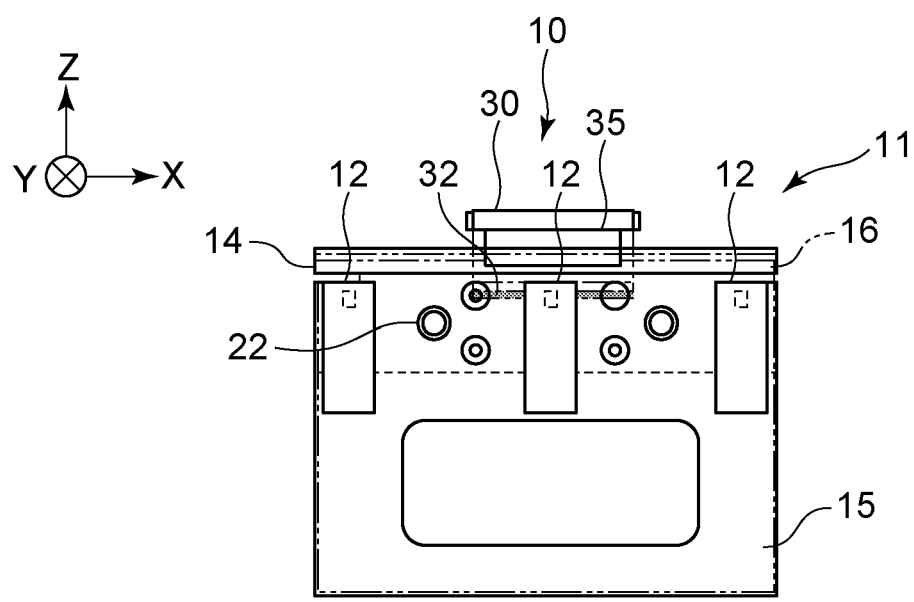
FIG. 15 is a front view illustrating a configuration of the transport apparatus according to the eighth embodiment of the invention.
Figure 16A:
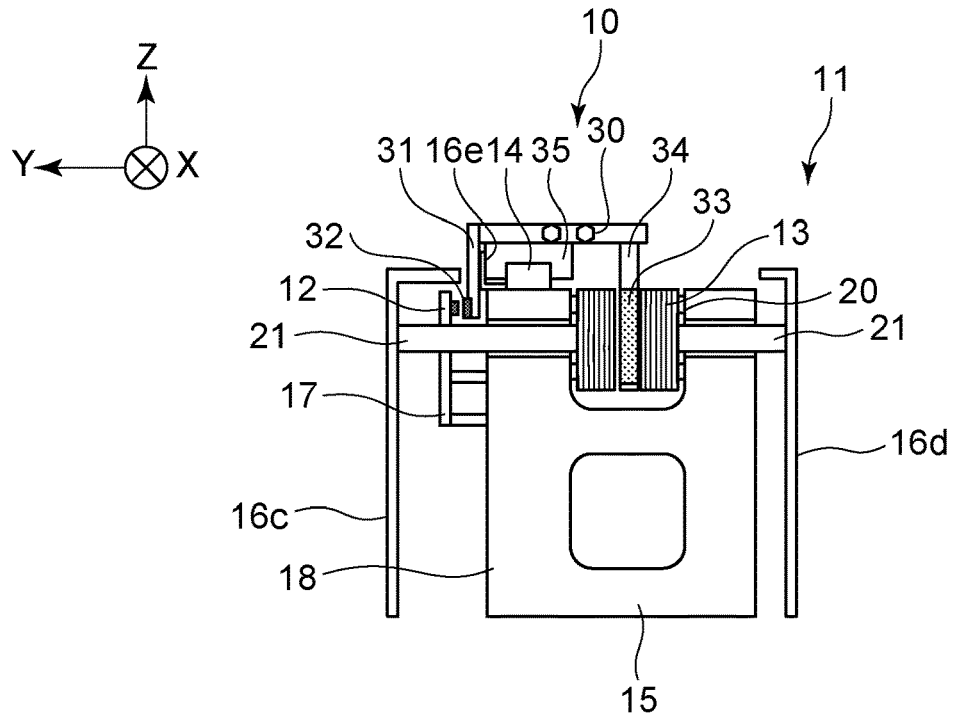
FIGS. 16A and 16B are sectional views illustrating a configuration of the transport apparatus according to the eighth embodiment of the invention.
Figure 16B:
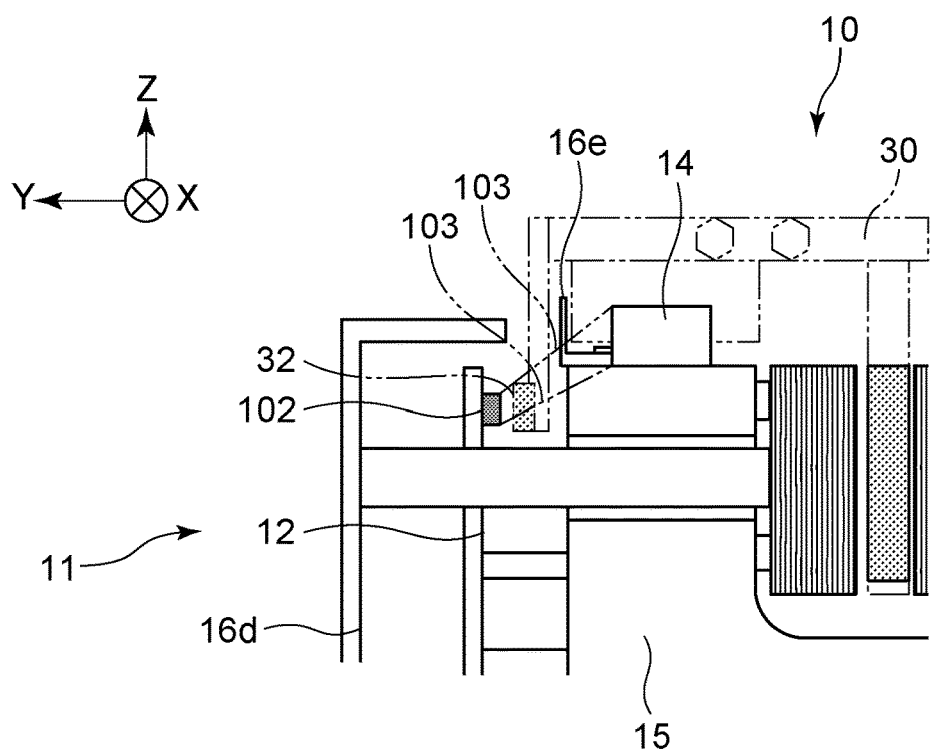

FIG. 15 is a front view illustrating a configuration of a transport apparatus of the ninth embodiment of the invention. FIG. 16A is a detailed sectional view illustrating a configuration of the transport apparatus according to the ninth embodiment and FIG. 16B is a partial enlarged view of a sectional surface of the transport module 11 of FIG. 16A taken along a plane (Y-Z plane) vertical to at least the movement direction (X direction) of the transport carriage 10. In FIG. 16B, since the transport carriage 10 moves on the transport module 11, the transport carriage 10 is positioned on the transport module 11 in some cases and is not positioned on the transport module 11 in other cases. Therefore, a part of the transport carriage 10 is described with a two-dotted dash line.

In the transport module 11, a pair of carriage driving coils 13 are installed so as to face an inner wall of the transport module housing 15 that has a top-opened concave structure. A configuration is such that the permanent magnet 33 and the permanent magnet bracket 34 that are installed on the transport carriage 10 pass through a space between the pair of carriage driving coils 13.

Each of the carriage driving coils 13 is installed with the heat insulation spacer 20 interposed between the carriage driving coil 13 and the transport module housing 15. The cover post 21 is installed in the carriage driving coil 13 and covers 16d and 16e are installed on the cover post 21. The through hole 22 is provided on the transport module housing 15 and the cover post 21 is installed through the through hole 22.

The encoder 12 is installed on the encoder installation surface 18 provided in the transport module housing 15 through the encoder bracket 17.

A one-row guide rail 14 is installed on the top surface of the transport module housing 15. The cover 16e is installed on a guide rail side part.

The guide block 35 and the permanent magnet bracket 34 are installed on the lower surface of the carriage base 30 to form a T-shape structure. The scale 32 is installed on the side surface of the carriage base 30 through the scale bracket 31.

The lower controller 23 is installed in an inside of the stand 02 (not illustrated) or the like and is connected to the transport module 11 with a cable or the like.

Next, a detailed structure of the transport module in the ninth embodiment of the invention will be described with reference to FIG. 16B.

The straight lines 103 indicate straight lines connecting the guide rail 14 and the encoder detecting unit 102 at ends in a range where the guide rail 14 faces the encoder detecting unit 102. That is, a range surrounded by a part of the guide rail 14 and a part of the encoder detecting unit 102, which face each other, and the straight lines 103 indicates a main scattering path of the lubricant coated on the guide rail 14 to the encoder detecting unit 102. Specifically, in the sectional surface illustrated in FIG. 16B, the range is between the straight line 103a connecting the upper end of the encoder detecting unit 102 and the upper end of the guide rail 14, which is on the encoder side, and the straight line 103b connecting the lower end of the encoder detecting unit 102 and the lower end of the guide rail 14, which is on the encoder side. By installing the cover 16e so as to block the scattering path of the lubricant to the encoder detecting unit 102, it is possible to prevent the lubricant from being attached to the encoder detecting unit 102. In other words, at least the cover 16e is installed on the straight line connecting the guide rail 14 and the encoder detecting unit 102. This makes it possible to prevent the lubricant from being attached to the encoder detecting unit 102.

Specifically, the guide rail 14 is installed on the top surface of the transport module housing 15 and the cover 16e is installed on the side surface of the guide rail 14. The scale 32 provided on the transport carriage 10 is provided so as to be able to pass through a gap between each of the cover 16d and the cover 16e and the transport module housing 15.

The encoder detecting unit 102 is installed on the side surface of the transport module housing 15 and installed at a position lower than the guide rail 14. Thus, the straight line 103b connecting the guide rail 14 and the encoder detecting unit 102 is shielded by the cover 16e and the transport module housing 15. The structure may be such that a range surrounded by the straight lines 103a and 103b connecting the guide rail 14 and the encoder detecting unit 102 is shielded by shapes of both the cover 16 and the transport module housing 15.

The cover 16e has a height higher than that of the guide rail 14. Such a configuration is more effective in a case where the encoder detecting unit 102 is installed at a position lower than the guide rail 14, because it is possible to prevent scattering of the lubricant in a horizontal direction and a direction lower than the horizontal direction.

In both the eighth embodiment and the ninth embodiment, the cover (16a, 16e) is configured to cover the encoder 12 and the transport module housing 15. Thus, the configuration is such that heat generated from the encoder 12 or the carriage driving coil 13 installed on the transport module housing 15 is easily accumulated. On the other hand, in a case where lubricating grease that has high viscosity is used for lubrication of the guide rail 14 and the guide block 35, the lubricating grease scatters with a certain degree of mass and size. Thus, when the cover 16 is formed of a porous material, a configuration in which both a cooling effect and an encoder protection effect are achieved is also able to be selected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-208421 filed Oct. 27, 2017, No. 2017-208422 filed Oct. 27, 2017, and No. 2017-230989 filed Nov. 30, 2017, which are hereby incorporated by reference herein in their entirety.

What is claimed is:

1. A transport system comprising:
    a fixed portion;
    a moving portion movable in a transport direction with respect to the fixed portion, wherein the moving portion includes a first part, a second part, and a third part where the first part and the second part face each other and are connected by the third part, and includes an in-between part of the fixed portion is positioned between the first part and the second part;
    a guide block disposed on a surface of the first part of the moving portion which faces the in-between part of the fixed portion;
    a workpiece attachment portion disposed on a surface opposite to the surface on which the guide block is disposed, wherein the workpiece attachment portion is attachable to a workpiece;
    a guide rail configured to guide the guide block in the transport direction, wherein the guide rail is disposed on a surface of the fixed portion which faces the guide block;
    a magnet disposed on a surface of the second part of the moving portion which faces the in-between part of the fixed portion; and
    a coil configured to form a magnetic circuit with the magnet across a gap fixed between the magnet and the coil, wherein the coil is disposed on a surface of the in-between part which faces the magnet,
    wherein the workpiece attachment portion, the guide block, and the guide rail are arranged to be arrayed in order in a vertical direction as viewed in the transport direction.

2. The transport system according to claim 1,
    wherein a scale for position detection is installed on the first part of the moving portion, and
    wherein a detecting unit configured to detect a position of the moving portion is disposed on the fixed portion at a position facing the scale.

3. The transport system according to claim 2, wherein the position facing the scale is a position higher than the guide rail.

4. The transport system according to claim 2, wherein the fixed portion has a cover between the detecting unit and the guide rail.

5. The transport system according to claim 1, wherein the guide block is installed so as to contact a step that is formed on an installation surface of the moving portion and extends in the transport direction.

6. The transport system according to claim 1, wherein the guide rail is installed so as to contact a step that is formed on an installation surface of the fixed portion and extends in the transport direction.

7. The transport system according to claim 1,
    wherein the fixed portion includes a first part, a second part installed on a base, and a third part, and
    wherein the in-between part of the fixed portion is the first part of the fixed portion and is positioned between the first part of the moving portion and the second part of the moving portion,
    wherein the second part of the fixed portion is positioned opposite to the first part of the fixed portion with the second part of the moving portion between the second and first part of the fixed portion, and
    wherein the third part of the fixed portion connects the first part of the fixed portion and the second part of the fixed portion.

8. The transport system according to claim 7, wherein a detecting unit configured to detect a position of the moving portion is installed on a center part of an external side surface of the third part of the fixed portion.

9. The transport system according to claim 7, wherein a detecting unit configured to detect a position of the moving portion is installed on an external side surface of the third part of the fixed portion through a thermal displacement alleviating portion.

10. The transport system according to claim 9, wherein the thermal displacement alleviating portion is a slip spacer.

11. The transport system according to claim 10, wherein the slip spacer is formed of resin or ceramic.

12. The transport system according to claim 1, wherein the fixed portion has an installation portion configured to allow installation on a floor or a ceiling.

13. The transport system according to claim 1,
    wherein the first part, the second part, and the third part of the moving portion are part of a carriage, and
    wherein the guide block on the moving portion, the guide rail, the coil on the fixed portion, and the magnet on the moving portion are arranged arrayed in order in a direction in which an attractive force F generated between the magnet and the coil acts in a way that results in suppression of deformation of the carriage to within a predetermined range.

14. The transport system according to claim 13, wherein the attractive force F generated between the magnet and the coil acts in a direction that is perpendicular to the transport direction.

15. The transport system according to claim 1, wherein center positions of the guide block on the moving portion, the guide rail, the coil on the fixed portion, and the magnet on the moving portion are overlapped in a sectional surface vertical to the transport direction.

16. The transport system according to claim 1,
    wherein the first part, the second part, and the third part of the moving portion are part of a carriage, and
    wherein the guide rail, the guide block, the coil, and the magnet are arranged so that respective X-Z virtual planes passing through centers of the guide rail, the guide block, the coil, and the magnet in a direction that is perpendicular to the transport direction are overlapped in a way that results in suppression of deformation of the carriage to within a first predetermined range.

17. The transport system according to claim 16,
    wherein the first part, the second part, and the third part of the moving portion are part of a carriage, and
    wherein the guide block, the coil, and the magnet are arranged so that the respective X-Z virtual planes of the guide block, the coil, and the magnet fall within a guide rail predetermined range of a width of the guide rail where the guide rail predetermined range is determined so that the determined predetermined range results in suppression of deformation of the carriage to within a second predetermined range.

18. An article manufacturing method of manufacturing an article by using a processing system having a transport system and a processing apparatus configured to apply a processing work to a workpiece mounted on a moving portion of the transport system,
wherein the transport system includes:
a fixed portion,
the moving portion movable in a transport direction with respect to the fixed portion, wherein the moving portion includes, as a carriage, a first part, a second part, and a third part where the first part and the second part face each other and are connected by the third part, and includes an in-between part of the fixed portion is positioned between the first part and the second part,
a guide block disposed on a surface of the first part of the moving portion which faces the in-between part of the fixed portion,
a workpiece attachment portion disposed on a surface opposite to the surface on which the guide block is disposed, wherein the workpiece attachment portion is attachable to a workpiece,
a guide rail configured to guide the guide block in the transport direction, wherein the guide rail is disposed on a surface of the fixed portion which faces the guide block,
a magnet disposed on a surface of the second part of the moving portion which faces the in-between part of the fixed portion, and
a coil configured to form a magnetic circuit with the magnet across a gap fixed between the magnet and the coil, wherein the coil is disposed on a surface of the in-between part which faces the magnet, and
wherein the workpiece attachment portion, the guide block, and the guide rail are arranged to be arrayed in order in a vertical direction as viewed in the transport direction,
the article manufacturing method comprising:
transporting the workpiece by the carriage; and
applying the processing work to the workpiece by the processing apparatus.

19. A transport system comprising:
a fixed portion;
a moving portion movable in a transport direction with respect to the fixed portion, wherein the moving portion includes a first part, a second part, and a third part where the first part and the second part face each other and are connected by the third part, and includes an in-between part of the fixed portion is positioned between the first part and the second part;
a guide block disposed on a surface of the first part of the moving portion which faces the in-between part of the fixed portion;
a guide rail configured to guide the guide block in the transport direction, wherein the guide rail is disposed on a surface of the fixed portion which faces the guide block;
a magnet disposed on a surface of the second part of the moving portion which faces the in-between part of the fixed portion; and
a coil configured to form a magnetic circuit with the magnet across a gap fixed between the magnet and the coil, wherein the coil is disposed on a surface of the in-between part which faces the magnet,
wherein a scale for position detection is installed on the first part of the moving portion, and a detecting unit configured to detect a position of the moving portion is disposed on the fixed portion at a position facing the scale, where the position facing the scale is a position higher than the guide rail.

* * * * *